US012763906B2

(12) United States Patent
Chen et al.

(10) Patent No.: US 12,763,906 B2
(45) Date of Patent: Oct. 13, 2026

(54) SELECTING A PHASE TRACKING REFERENCE SIGNAL DEMODULATION REFERENCE SIGNAL ASSOCIATION BITFIELD LENGTH

(71) Applicant: QUALCOMM Incorporated, San Diego, CA (US)

(72) Inventors: Yitao Chen, San Marcos, CA (US); Mostafa Khoshnevisan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 276 days.

(21) Appl. No.: 18/592,080

(22) Filed: Feb. 29, 2024

(65) Prior Publication Data

US 2024/0333456 A1 Oct. 3, 2024

Related U.S. Application Data

(60) Provisional application No. 63/492,330, filed on Mar. 27, 2023.

(51) Int. Cl.
*H04L 5/00* (2006.01)
*H04W 72/1268* (2023.01)
(Continued)

(52) U.S. Cl.
CPC ....... *H04L 5/0051* (2013.01); *H04W 72/1268* (2013.01); *H04W 72/232* (2023.01); *H04W 76/20* (2018.02)

(58) Field of Classification Search
CPC ................................ H04L 12/28; H04L 12/50
(Continued)

(56) References Cited

U.S. PATENT DOCUMENTS

| | | | | |
|---|---|---|---|---|
| 11,621,818 B2 * | 4/2023 | Venugopal | H04W 72/0446 | 370/336 |
| 2016/0157218 A1 * | 6/2016 | Nam | H04B 7/0639 | 370/329 |
| 2025/0167954 A1 * | 5/2025 | Lim | H04B 7/0628 | |

OTHER PUBLICATIONS

Gaal P (Qualcomm Incorporated)., et al., "Simultaneous Multi-Panel Transmission", 3GPP Draft, 3GPP TSG RAN WG1 #112, R1-2301400, Type Discussion, NR_MIMO_EVO_DL_UL-CORE, 3rd Generation Partnership Project, Mobile Competence Centre, 650, Route Des Lucioles, F-06921 Sophia-Antipolis Cedex, France, vol. 3GPP RAN 1, No. Athens, GR, Feb. 27, 2023-Mar. 3, 2023, Feb. 17, 2023, XP052248533, pp. 1-20, sections 3.1-3.2.

(Continued)

*Primary Examiner* — Dang T Ton
(74) *Attorney, Agent, or Firm* — HARRITY & HARRITY LLP

(57) ABSTRACT

Various aspects of the present disclosure generally relate to wireless communication. In some aspects, a network node may derive a first potential length for a phase tracking reference signal demodulation reference signal (PTRS-DMRS) association bitfield based at least in part on a simultaneous transmissions with multiple panels (STxMP) configuration. The network node may derive a second potential length for the PTRS-DMRS association bitfield based at least in part on a single transmit receive point (sTRP) configuration. The network node may select a finalized length based at least in part on the first potential length and the second potential length. The network node may indicate a relationship between a PTRS port and a DMRS port based at least in part on transmitting downlink control information (DCI) using a DCI configuration that is associated with the finalized length of the PTRS-DMRS association bitfield. Numerous other aspects are described.

20 Claims, 11 Drawing Sheets

(51) Int. Cl.
*H04W 72/232* (2023.01)
*H04W 76/20* (2018.01)

(58) Field of Classification Search
USPC ................................ 370/329, 401, 402, 403
See application file for complete search history.

(56) References Cited

OTHER PUBLICATIONS

International Search Report and Written Opinion—PCT/US2024/018212—ISA/EPO—Jun. 18, 2024.

Lin H (Oppo)., et al., "Discussion on UL Precoding Indicaton for Multi-panel Transmission", 3GPP Draft, 3GPP TSG RAN WG1 #112, R1-2300253, Type Discussion, NR_MIMO_EVO_DL_UL-CORE, 3rd Generation Partnership Project, Mobile Competence Centre, 650, Route Des Lucioles, F-06921 Sophia-Antipolis Cedex, France, vol. 3GPP RAN 1, No. Athens, GR, Feb. 27, 2023-Mar. 3, 2023, Feb. 17, 2023, XP052247401, 14 pages, sections 2.1-2.3.

* cited by examiner

SELECTING A PHASE TRACKING REFERENCE SIGNAL DEMODULATION REFERENCE SIGNAL ASSOCIATION BITFIELD LENGTH

CROSS-REFERENCE TO RELATED APPLICATION

This Patent Application claims priority to U.S. Provisional Patent Application No. 63/492,330, filed on Mar. 27, 2023, entitled "SELECTING A PHASE TRACKING REFERENCE SIGNAL DEMODULATION REFERENCE SIGNAL ASSOCIATION BITFIELD LENGTH," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for selecting a phase tracking reference signal demodulation reference signal association bitfield length.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include deriving a first potential length for a phase tracking reference signal demodulation reference signal (PTRS-DMRS) association bitfield based at least in part on a simultaneous transmissions with multiple panels (STxMP) configuration. The method may include deriving a second potential length for the PTRS-DMRS association bitfield based at least in part on a single transmit receive point (sTRP) configuration. The method may include selecting a finalized length for the PTRS-DMRS association bitfield based at least in part on the first potential length and the second potential length. The method may include indicating a relationship between a phase tracking reference signal (PTRS) port and a demodulation reference signal (DMRS) port based at least in part on transmitting downlink control information (DCI) using a DCI configuration that is associated with the finalized length of the PTRS-DMRS association bitfield.

Some aspects described herein relate to a method of wireless communication performed by a user equipment (UE). The method may include deriving a first potential length for a PTRS-DMRS association bitfield based at least in part on an STxMP configuration. The method may include deriving a second potential length for the PTRS-DMRS association bitfield based at least in part on an sTRP configuration. The method may include selecting a finalized length for the PTRS-DMRS association bitfield based at least in part on the first potential length and the second potential length. The method may include communicating with a network node based at least in part on recovering an indication of a relationship between a PTRS port and a DMRS port from DCI and using a DCI configuration that is based at least in part on the finalized length of the PTRS-DMRS association bitfield.

Some aspects described herein relate to an apparatus for wireless communication at a network node. The apparatus may include a memory and one or more processors coupled to the memory. The one or more processors may be configured to cause the network node to derive a first potential length for a PTRS-DMRS association bitfield based at least in part on an STxMP configuration. The one or more processors may be configured to cause the network node to derive a second potential length for the PTRS-DMRS association bitfield based at least in part on an sTRP configuration. The one or more processors may be configured to cause the network node to select a finalized length for the PTRS-DMRS association bitfield based at least in part on the first potential length and the second potential length. The one or more processors may be configured to cause the network node to indicate a relationship between a PTRS port and a DMRS port based at least in part on transmitting DCI using a DCI configuration that is associated with the finalized length of the PTRS-DMRS association bitfield.

Some aspects described herein relate to an apparatus for wireless communication at a UE. The apparatus may include a memory and one or more processors coupled to the memory. The one or more processors may be configured to cause the UE to derive a first potential length for a PTRS-DMRS association bitfield based at least in part on an STxMP configuration. The one or more processors may be configured to cause the UE to derive a second potential length for the PTRS-DMRS association bitfield based at least in part on an sTRP configuration. The one or more processors may be configured to cause the UE to select a finalized length for the PTRS-DMRS association bitfield based at least in part on the first potential length and the second potential length. The one or more processors may be configured to cause the UE to communicate with a network node based at least in part on recovering an indication of a relationship between a PTRS port and a DMRS port from DCI and using a DCI configuration that is based at least in part on the finalized length of the PTRS-DMRS association bitfield.

Some aspects described herein relate to a non-transitory computer-readable medium that stores a set of instructions for wireless communication by a network node. The set of instructions, when executed by one or more processors of the network node, may cause the network node to derive a first potential length for a PTRS-DMRS association bitfield based at least in part on an STxMP configuration. The set of instructions, when executed by one or more processors of the network node, may cause the network node to derive a second potential length for the PTRS-DMRS association bitfield based at least in part on an sTRP configuration. The set of instructions, when executed by one or more processors of the network node, may cause the network node to select a finalized length for the PTRS-DMRS association bitfield based at least in part on the first potential length and the second potential length. The set of instructions, when executed by one or more processors of the network node, may cause the network node to indicate a relationship between a PTRS port and a DMRS port based at least in part on transmitting DCI using a DCI configuration that is associated with the finalized length of the PTRS-DMRS association bitfield.

Some aspects described herein relate to a non-transitory computer-readable medium that stores a set of instructions for wireless communication by a UE. The set of instructions, when executed by one or more processors of the UE, may cause the UE to derive a first potential length for a PTRS-DMRS association bitfield based at least in part on an STxMP configuration. The set of instructions, when executed by one or more processors of the UE, may cause the UE to derive a second potential length for the PTRS-DMRS association bitfield based at least in part on an sTRP configuration. The set of instructions, when executed by one or more processors of the UE, may cause the UE to select a finalized length for the PTRS-DMRS association bitfield based at least in part on the first potential length and the second potential length. The set of instructions, when executed by one or more processors of the UE, may cause the UE to communicate with a network node based at least in part on recovering an indication of a relationship between a PTRS port and a DMRS port from DCI and using a DCI configuration that is based at least in part on the finalized length of the PTRS-DMRS association bitfield.

Some aspects described herein relate to an apparatus for wireless communication. The apparatus may include means for deriving a first potential length for a PTRS-DMRS association bitfield based at least in part on an STxMP configuration. The apparatus may include means for deriving a second potential length for the PTRS-DMRS association bitfield based at least in part on an sTRP configuration. The apparatus may include means for selecting a finalized length for the PTRS-DMRS association bitfield based at least in part on the first potential length and the second potential length. The apparatus may include means for indicating a relationship between a PTRS port and a DMRS port based at least in part on transmitting DCI using a DCI configuration that is associated with the finalized length of the PTRS-DMRS association bitfield.

Some aspects described herein relate to an apparatus for wireless communication. The apparatus may include means for deriving a first potential length for a PTRS-DMRS association bitfield based at least in part on an STxMP configuration. The apparatus may include means for deriving a second potential length for the PTRS-DMRS association bitfield based at least in part on an sTRP configuration. The apparatus may include means for selecting a finalized length for the PTRS-DMRS association bitfield based at least in part on the first potential length and the second potential length. The apparatus may include means for communicating with a network node based at least in part on recovering an indication of a relationship between a PTRS port and a DMRS port from DCI and using a DCI configuration that is based at least in part on the finalized length of the PTRS-DMRS association bitfield.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
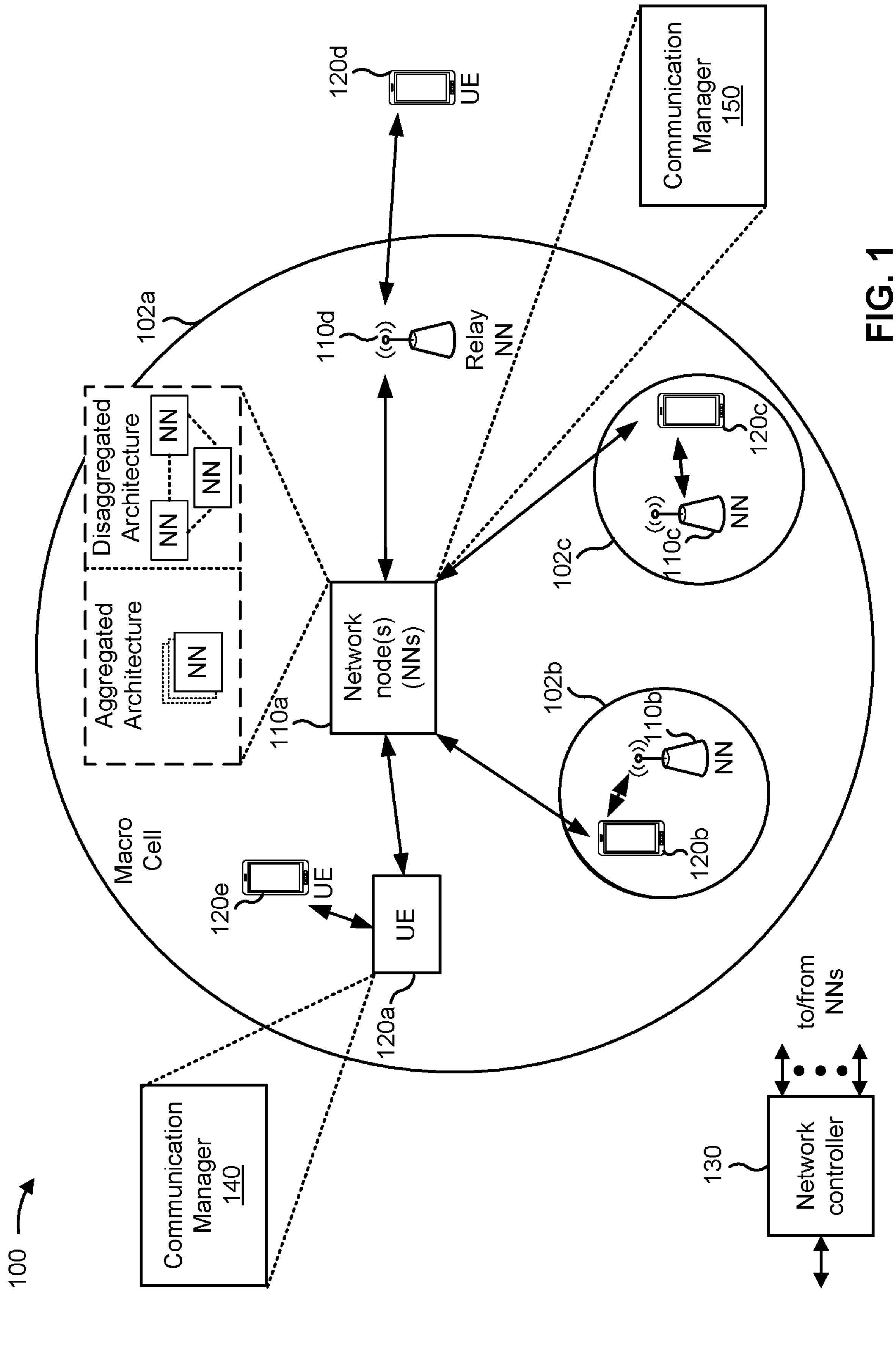
FIG. 1 is a diagram illustrating an example of a wireless network, in accordance with the present disclosure.

A single downlink control information (DCI) may include a phase tracking reference signal demodulation reference signal (PTRS-DMRS) association bitfield that indicates a relationship between a phase tracking reference signal (PTRS) port and a demodulation reference signal (DMRS) port. The configuration of the PTRS-DMRS association bitfield may be based at least in part on a first configured maximum layers value (e.g., maxVal) for single transmit receive point (sTRP) communications. For simultaneous transmissions with multiple panels (STxMP) communications, however, the maximum number of layers may be different from the sTRP communications and/or may be indicated by a different configured value. The different mechanisms for determining a maximum number of layers for a transmission may result in ambiguity on a bitlength and/or presence of the PTRS-DMRS association bitfield in DCI when dynamically switching between an sTRP operating mode and an STxMP operating mode. Having ambiguity in the length and/or presence of a PTRS-DMRS association bitfield in DCI may result in a user equipment (UE) misinterpreting information in DCI and, subsequently, result in misaligned and/or failed communications between the UE and a network node. That is, the UE misinterpreting information in DCI may result in the UE using different transmission parameters for an uplink transmission than expected by the network node, and may result in the network node failing to receive and/or decode the uplink transmission.

Some techniques and apparatuses described herein provide for selecting a PTRS-DMRS association bitfield length for transitions between STxMP transmissions and sTRP transmissions. In some aspects, a network node may derive a first potential length for a PTRS-DMRS association bitfield based at least in part on an STxMP operating mode, such as a spatial division multiplexing (SDM) operating mode or a single frequency network (SFN) operating mode. The network node may also derive a second potential length for the PTRS-DMRS association bitfield based at least in part on an sTRP configuration. Based at least in part on deriving the first potential length and the second potential length, the network node may select a finalized length for the PTRS-DMRS association bitfield based at least in part on the first potential length and the second potential length. In some aspects, the network node may indicate a relationship between a PTRS port and a DMRS port based at least in part on transmitting a DCI with a configuration that is associated with the finalized length of the PTRS-DMRS association bitfield.

In some aspects, a UE may derive a first potential length for a PTRS-DMRS association bitfield based at least in part on an STxMP operating mode, such as an SDM operating mode or an SFN operating mode. The UE may also derive a second potential length for the PTRS-DMRS association bitfield based at least in part on an sTRP configuration. Based at least in part on deriving the first potential length and the second potential length, the UE may select a finalized length for the PTRS-DMRS association bitfield based at least in part on the first potential length and the second potential length. In some aspects, the UE may communicate with a network node based at least in part on recovering an indication of a relationship between a PTRS port and a DMRS port from DCI using a DCI configuration that is based at least in part on the finalized length of the PTRS-DMRS association bitfield.

A network node and a UE may derive a bit length of a PTRS-DMRS association bitfield using same and/or commensurate information. Using the same and/or commensurate information may synchronize how a network node may configure DCI and how a UE recovers information from the DCI. Deriving the bit length of the PTRS-DMRS association bitfield jointly from an STxMP operating mode and an sTRP configuration may result in a DCI configuration that both supports dynamic switching between an STxMP operating mode and an sTRP operating mode, and maintains an ability to indicate a relationship between one or more PTRS ports and one or more DMRS ports in both operating modes. Alternatively, or additionally, the network node and the UE deriving the bit length of the PTRS-DMRS association bitfield using same and/or commensurate information may mitigate ambiguity in the bit length of the PTRS-DMRS association bitfield and, subsequently, mitigate ambiguity in DCI. Accordingly, mitigating the ambiguity may enable the UE to generate an uplink transmission based at least in part on the recovered information (e.g., transmission parameters), and the network node to successfully receive and/or decode the uplink transmission.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node (e.g., the network node 110) may include a communication manager 150. As described in more detail elsewhere herein, the communication manager 150 may derive a first potential length for a PTRS-DMRS association bitfield based at least in part on an STxMP configuration; derive a second potential length for the PTRS-DMRS association bitfield based at least in part on an sTRP configuration; select a finalized length for the PTRS-DMRS association bitfield based at least in part on the first potential length and the second potential length; and indicate a relationship between a PTRS port and a DMRS port based at least in part on transmitting DCI using a DCI configuration that is associated with the finalized length of the PTRS-DMRS association bitfield. Additionally, or alternatively, the communication manager 150 may perform one or more other operations described herein.

In some aspects, a UE (e.g., the UE 120) may include a communication manager 140. As described in more detail elsewhere herein, the communication manager 140 may derive a first potential length for a PTRS-DMRS association bitfield based at least in part on an STxMP configuration; derive a second potential length for the PTRS-DMRS association bitfield based at least in part on an sTRP configuration; select a finalized length for the PTRS-DMRS association bitfield based at least in part on the first potential length and the second potential length; and communicate with a network node based at least in part on recovering an indication of a relationship between a PTRS port and a DMRS port from DCI and using a DCI configuration that is based at least in part on the finalized length of the PTRS-DMRS association bitfield. Additionally, or alternatively, the communication manager 140 may perform one or more other operations described herein.

As indicated above, FIG. 1 is provided as an example. Other examples may differ from what is described with regard to FIG. 1.

Figure 2:
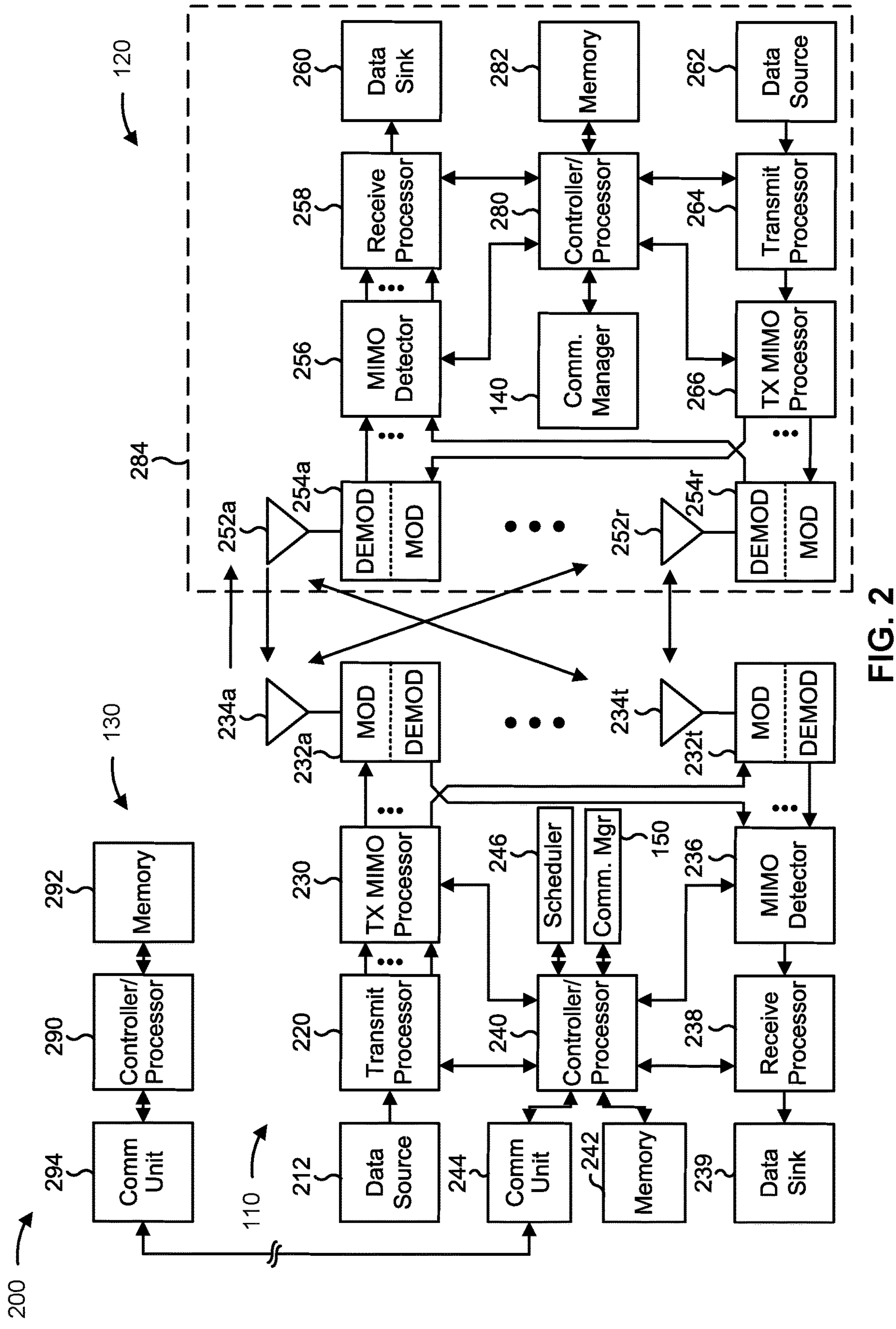
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6A-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6A-11).

The controller/processor 240 of the network node 110, the controller/processor 280 of the UE 120, and/or any other component(s) of FIG. 2 may perform one or more techniques associated with selecting a PTRS-DMRS association bitfield length, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a network node (e.g., the network node 110) includes means for deriving a first potential length for a PTRS-DMRS association bitfield based at least in part on an STxMP configuration; means for deriving a second potential length for the PTRS-DMRS association bitfield based at least in part on an sTRP configuration; means for selecting a finalized length for the PTRS-DMRS association bitfield based at least in part on the first potential length and the second potential length; and/or means for indicating a relationship between a PTRS port and a DMRS port based at least in part on transmitting DCI using a DCI configuration that is associated with the finalized length of the PTRS-DMRS association bitfield. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a UE (e.g., the UE 120) includes means for deriving a first potential length for a PTRS-DMRS association bitfield based at least in part on an STxMP configuration; means for deriving a second potential length for the PTRS-DMRS association bitfield based at least in part on an sTRP configuration; means for selecting a finalized length for the PTRS-DMRS association bitfield based at least in part on the first potential length and the second potential length; and/or means for communicating with a network node based at least in part on recovering an indication of a relationship between a PTRS port and a DMRS port from DCI and using a DCI configuration that is based at least in part on the finalized length of the PTRS-DMRS association bitfield. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
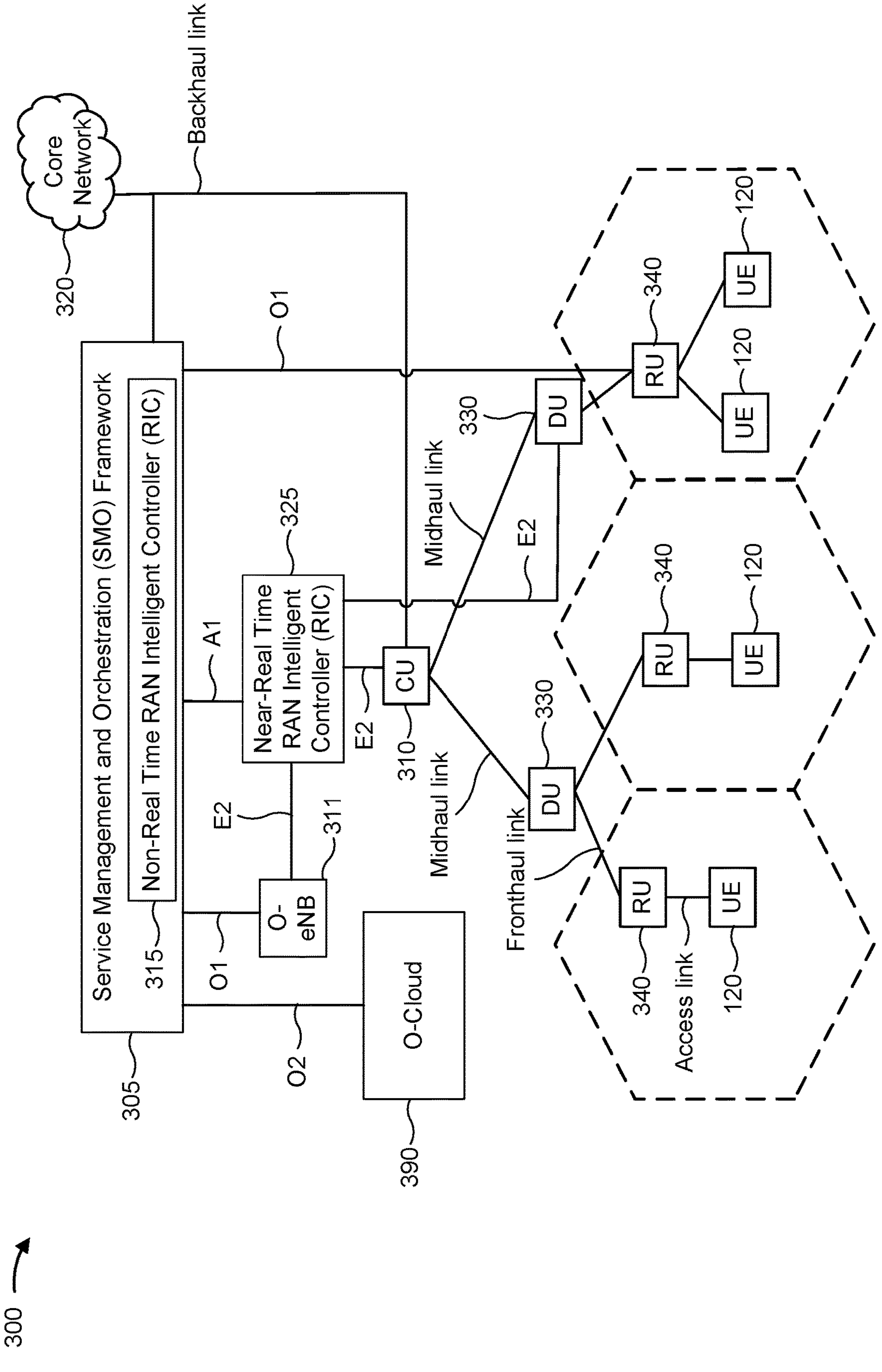
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
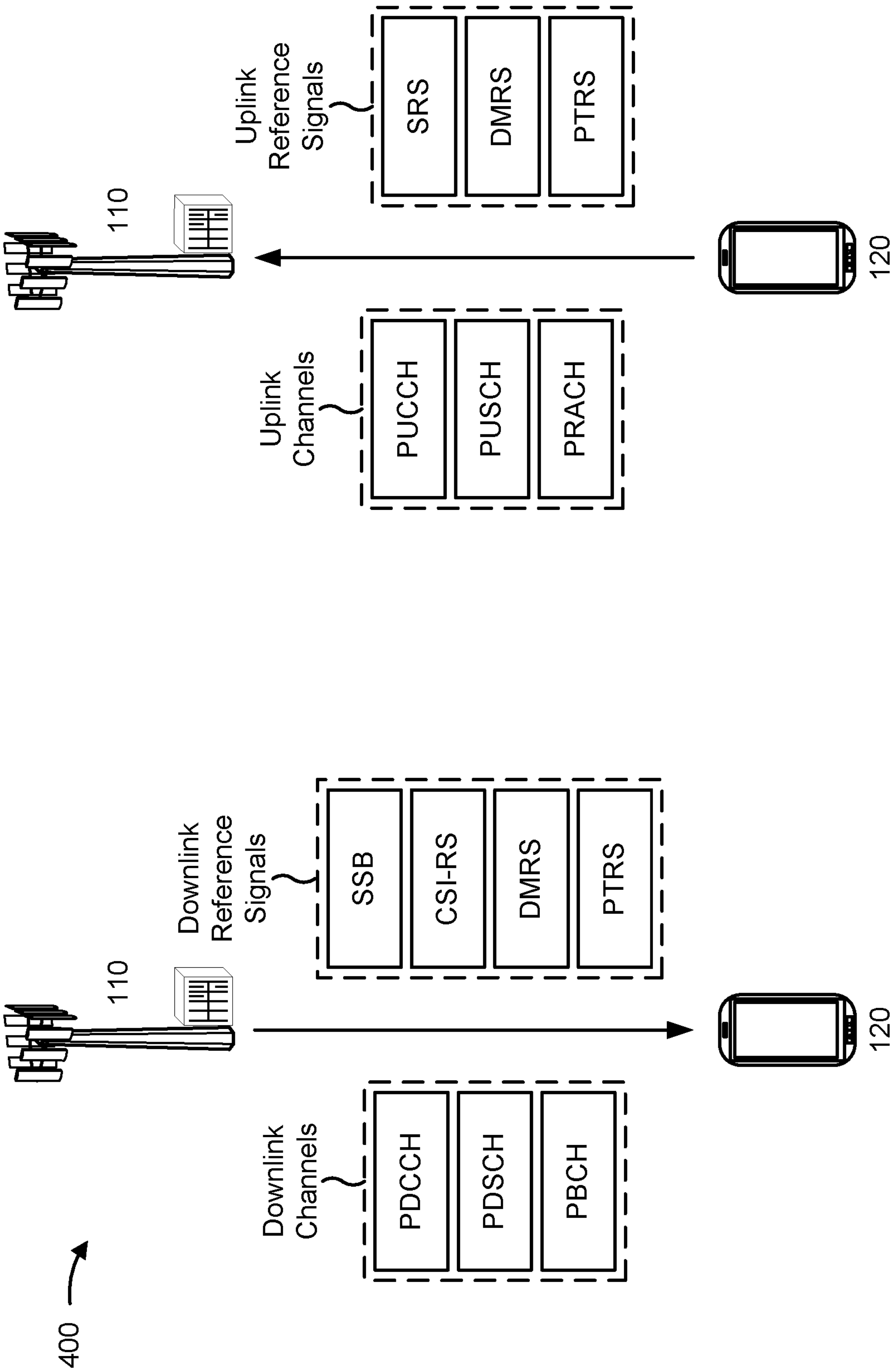
FIG. 4 is a diagram illustrating an example of physical channels and reference signals in a wireless network, in accordance with the present disclosure.

FIG. 4 is a diagram illustrating an example 400 of physical channels and reference signals in a wireless network, in accordance with the present disclosure. As shown in FIG. 4, downlink channels and downlink reference signals may carry information from a network node 110 to a UE 120, and uplink channels and uplink reference signals may carry information from a UE 120 to a network node 110.

As shown, a downlink channel may include a physical downlink control channel (PDCCH) that carries DCI, a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK and/or NACK feedback or ACK and/or NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a PTRS, among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the network node 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (e.g., in a CSI report), such as a CQI, a precoding matrix indicator (PMI), a CSI-RS resource indicator (CRI), a layer indicator (LI), a rank indicator (RI), or an RSRP, among other examples. The network node 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

An SRS may carry information used for uplink channel estimation, which may be used for scheduling, link adaptation, precoder selection, or beam management, among other examples. "SRS resource" may denote a location of an SRS in a resource grid and/or in the time and frequency domains, and "SRS resource set" may denote one or more SRS resources that are grouped together in a set. The network node 110 may configure (e.g., via radio resource control (RRC) signaling) one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

In some aspects, the network node 110 may configure one or more parameters of an SRS resource set, such as a list of SRS resources included in the SRS resource set (e.g., a list of SRS resource identifiers (IDs)), a resource type of the SRS resource set (e.g., aperiodic, periodic, and/or semi-persistent), and/or a usage (e.g., codebook, non-codebook, beam management, and/or antenna switching). For a codebook usage type, the UE may be configured with up to one SRS resource set that includes up to two SRS resources. For a non-codebook usage type, the UE may be configured with up to one SRS resource set that includes up to four SRS resources. Alternatively, or additionally, the network node 110 may configure one or more parameters of an SRS resource (e.g., via RRC signaling), such as an SRS resource ID associated with the SRS resource, resource mapping of the SRS resource (e.g., a start position of the SRS resource and/or a number of symbols the SRS resource occupies), and/or a PTRS port index associated with the SRS resource. In some aspects, the PTRS port index of an SRS resource may only be applicable for a non-codebook based uplink MIMO transmission and/or when a PTRS uplink configuration is set to cyclic prefix (CP)-OFDM.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

In some aspects, a PTRS may be transmitted within one or more allocated resource blocks (RBs) allocated for a PUSCH and/or may be transmitted in one or more PUSCH OFDM symbols of an RB that do not include a DMRS. To illustrate, if a DMRS is present within a PUSH OFDM symbol, phase noise correction may be unnecessary and/or unessential. Accordingly, a PTRS transmission may use fewer resource elements (REs) of an RB and/or may occupy and/or utilize less frequency bandwidth relative to other reference signals (e.g., one tone per port for every two RBs, three RBs, and/or four RBs). Alternatively, or additionally, a PTRS transmission may be dense in a time domain (e.g., the PTRS may span one OFDM symbol, two OFDM symbols, and/or four OFDM symbols).

In some aspects, a presence and/or configuration of a PTRS may be RRC configured. That is, a network node 110 may transmit one or more configuration parameters of a PTRS in an RRC message, such as a maximum number of uplink ports (maxNrofPorts) for CP-OFDM, a resource element offset (resourceElementOffset) that indicates a subcarrier for CP-OFDM, and/or a frequency density of the PTRS. In some aspects, the network node 110 may configure the maximum number of uplink ports based at least in part on a communication configuration of a UE transmitting the (uplink) PTRS. As one example, for a communication configuration associated with transmitting and/or receiving CP-OFDM communications, the network node may configure the maximum number of uplink ports for transmitting the PTRS to "1" or "2". As another example, for a communication configuration associated with fully-coherent antennas at the UE, the network node may configure the maximum number of uplink ports for PTRS transmission to "1". Alternatively, or additionally, the UE may derive the maximum number of uplink ports for PTRS transmission based at least in part on any combination of non-codebook-based uplink communications, codebook-based uplink communications, and/or an SRS resource (e.g., indicated by an SRS resource indicator (SRI) field in DCI).

As one example, for non-codebook-based transmissions, the network node may configure the maximum number of uplink PTRS ports to "2" based at least in part on RRC signaling of a PTRS configuration information element (IE), and the UE may derive an actual number of ports to use for transmitting an uplink PTRS based at least in part on the SRI field. To illustrate, the SRI may indicate selection of one or more SRS resources (e.g., configured via RRC signaling) and, subsequently, a configuration associated with the respective SRS resource. In some aspects, the indicated SRS resource(s) may be configured with a same PTRS port index configuration as the PTRS configuration signaling, and the UE may derive to use a single PTRS port (e.g., the PTRS port associated with the indicated SRS resource and/or the PTRS configuration IE) for transmitting the uplink PTRS. Alternatively, or additionally, the indicated SRS resource(s) may be configured with a different PTRS port index configuration as the RRC signaled PTRS configuration, and the UE may derive to use two PTRS ports for transmitting the uplink PTRS.

As another example, for codebook-based transmissions, a UE with partial-coherent and/or non-coherent antennas may derive the actual number of PTRS ports based at least in part on a transmit precoding matric indicator (TPMI) field (e.g., indicated in DCI). For example, RRC signaling (e.g., a PTRS configuration IE) may configure the maximum number of uplink PTRS ports to "2", and the UE may derive the actual number of ports to use for transmitting an uplink PTRS based at least in part on the TPMI field. Accordingly, an uplink PTRS configuration (e.g., a number of transmission ports for uplink PTRS transmission) may be indicated in RRC signaling, derived by the UE based at least in part on an SRI field, and/or derived by the UE based at least in part on a TPMI field.

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network node 110 may then calculate a position of the UE 120 based on the RSTD measurements reported by the UE 120.

As indicated above, FIG. 4 is provided as an example. Other examples may differ from what is described with regard to FIG. 4.

Figure 5:
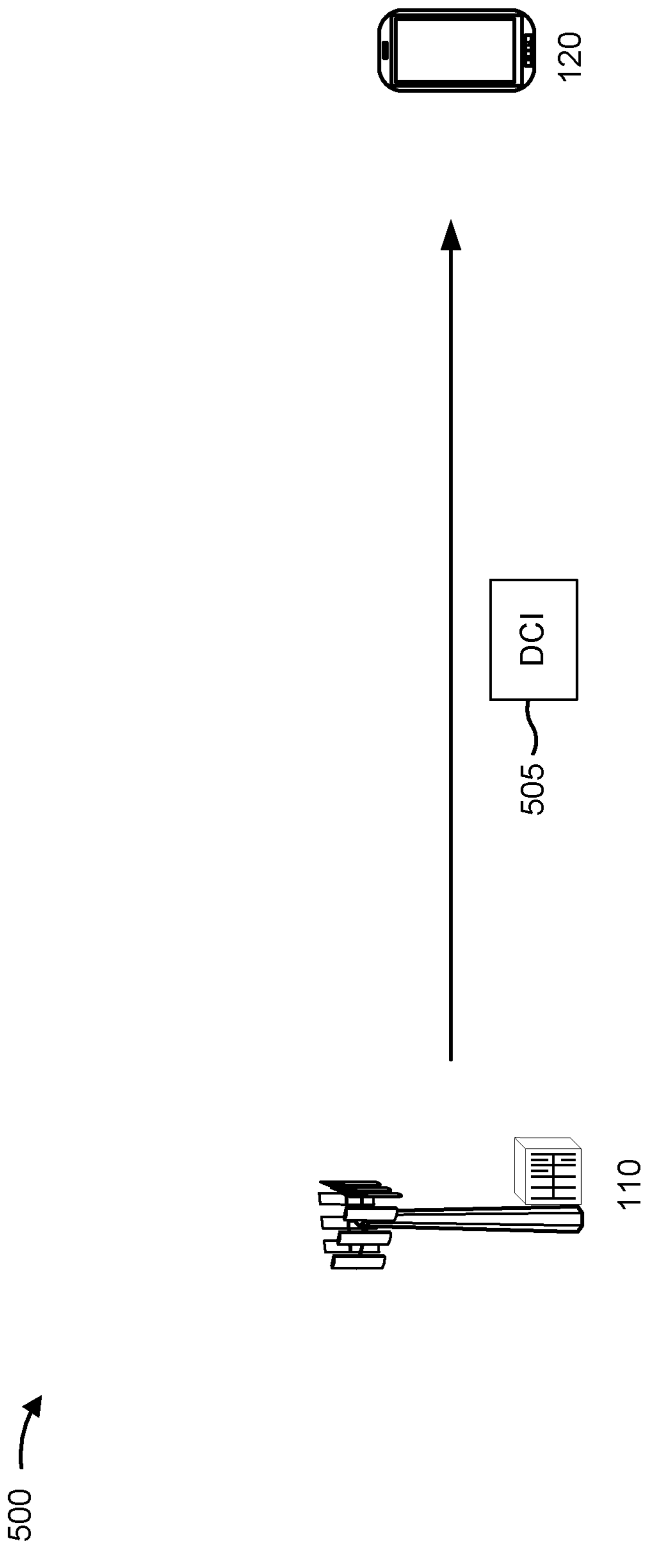
FIG. 5 is a diagram illustrating an example of downlink control information (DCI) that schedules one or more communications with a UE, in accordance with the present disclosure.

FIG. 5 is a diagram illustrating an example 500 of DCI that schedules one or more communications with a UE, in accordance with the present disclosure. As shown in FIG. 5, a network node 110 may communicate DCI to a UE 120 directly, but other examples may include the network node 110 communicating the DCI to the UE 120 via one or more network nodes.

The network node 110 may transmit, to the UE 120 (e.g., directly or via one or more network nodes), DCI 505 that schedules one or more communications for the UE 120. In some aspects, the network node 110 may transmit the DCI 505 in PDCCH and/or using Layer 1 signaling. "Downlink DCI" may refer to DCI that schedules a downlink communication (e.g., PDSCH) to the UE 120, and "uplink DCI" may refer to DCI that schedules an uplink communication (e.g., PUSCH) from the UE. The DCI 505 may indicate any combination of transmission information, such as a transmission format, an MCS, a resource allocation, and/or other types of information used by a transmitter to encode, and/or receiver to decode, transmitted data.

The DCI 505 may be configured in a variety of DCI formats that partition the DCI 505 into different bitfields that may be of varying length. Each DCI format may be associated with a different transmission direction and/or communication channel. As one example, "DCI Format 01" may be associated with a first communication configuration for a PUSCH communication and "DCI Format 02" may be associated with a second communication configuration for a PUSCH communication. "DCI Format 10" may be associated with a third communication configuration for a PDSCH communication and "DCI Format 1_1" may be associated with a fourth communication configuration for a PDSCH communication. "DCI Format 0_1" and "DCI Format 0_2" may both be referred to as uplink DCI, and DCI Format 1_0" and "DCI Format 1_1" may both be referred to as downlink DCI.

Each format may partition the DCI 505 differently such that each DCI format includes a different combination of bitfields relative to the other DCI formats. In some aspects, at least two DCI formats (e.g., one or more uplink DCI formats and/or one or more downlink DCI formats) may include a same bitfield (e.g., a same bit length in a same location of the DCI), such as a DCI format indicator field. Alternatively, or additionally, at least two DCI formats may include bitfields that indicate same transmission information and are positioned at different locations in the DCI and/or have a different bit length. For example, "DCI Format 1_0" and "DCI Format 0_1" may each include a respective MCS bitfield that is positioned at different locations in the DCI. In some aspects, uplink DCI formats (e.g., "DCI Format 0_1" and/or "DCI Format 0_2") may include one or more bitfields that are associated with uplink transmission information, and downlink DCI formats (e.g., "DCI Format 1_0" and/or "DCI Format 1_1") may include one or more bitfields that are associated with downlink transmission information.

A bitfield that is associated with uplink transmission information may be excluded from a downlink DCI format (or vice versa for a bitfield that is associated with downlink transmission information). To illustrate, one or more uplink DCI formats may include a PTRS-DMRS association bitfield that indicates a relationship between an uplink PTRS port and an uplink DMRS port to enable a UE to transmit uplink PTRS based at least in part on using a DMRS port that is associated with a stronger signal (e.g., a higher RSSI) relative to other ports. The PTRS-DMRS association bitfield may be excluded from one or more downlink DCI formats based at least in part on the PTRS-DMRS association bitfield providing uplink transmission information.

As indicated above, FIG. 5 is provided as an example. Other examples may differ from what is described with respect to FIG. 5.

Figure 6A:
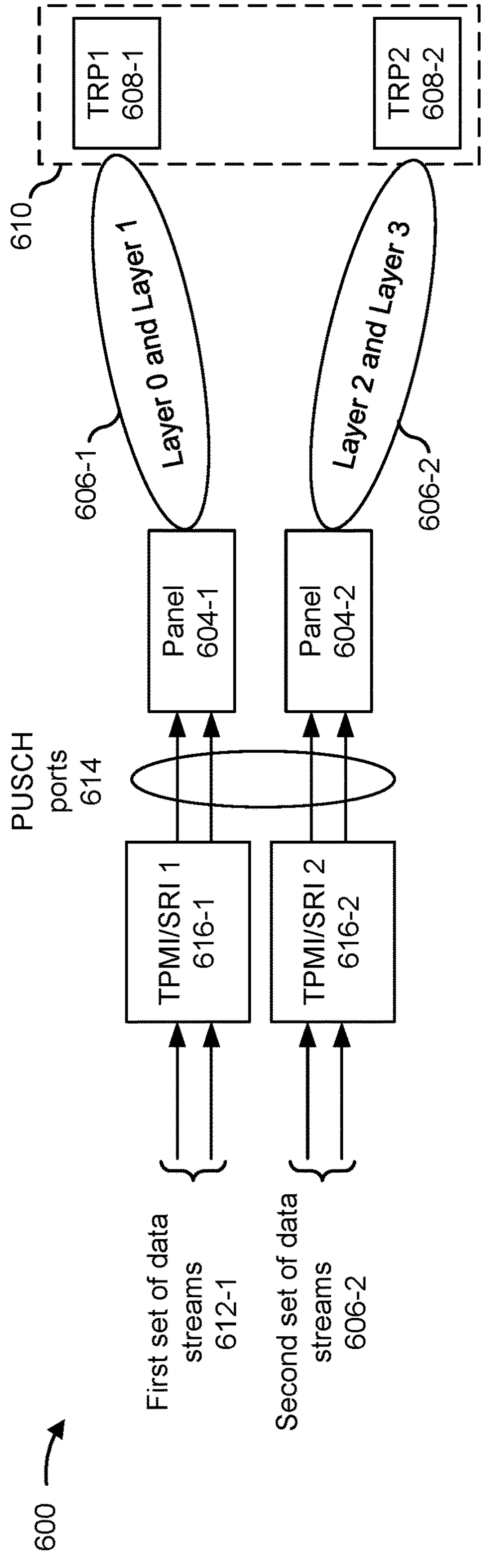
FIGS. 6A and 6B are diagrams illustrating a first example and a second example of simultaneous transmissions with multiple panels (STxMP), in accordance with the present disclosure.
Figure 6B:
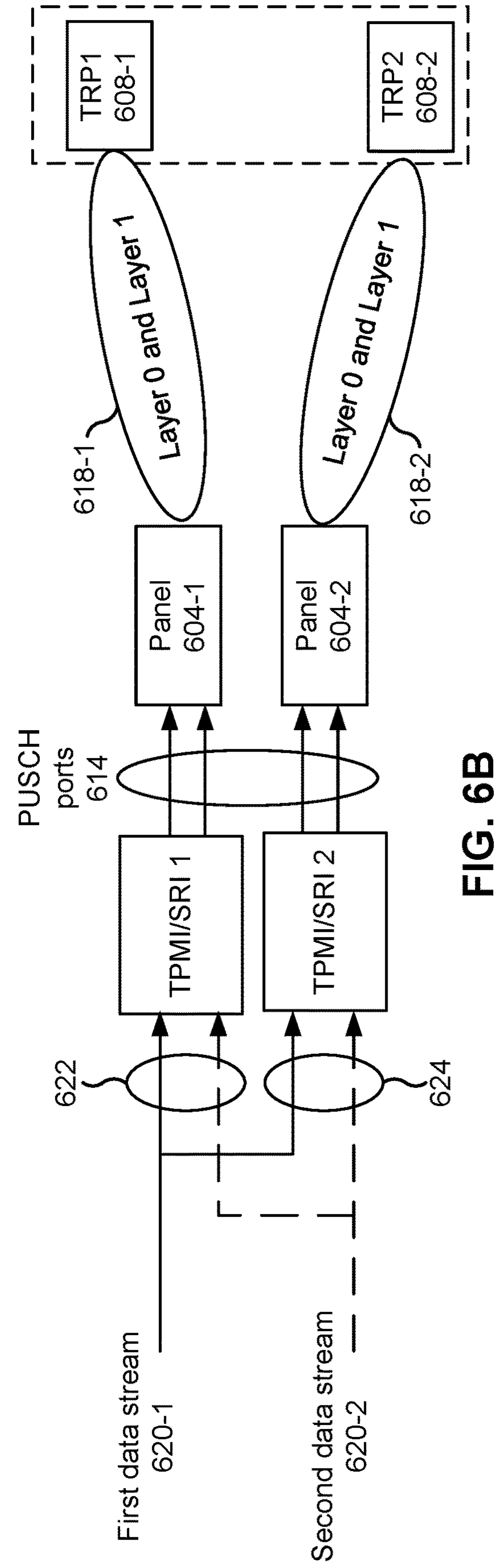

FIGS. 6A and 6B are diagrams illustrating a first example 600 and a second example 602 of STxMP, in accordance with the present disclosure.

The first example 600 shown by FIG. 6A is an example of STxMP that is based at least in part on uplink SDM. To illustrate, a UE (e.g., a UE 120) may include at least a first antenna panel 604-1 and a second antenna panel 604-2. In some aspects, the UE may configure each antenna panel separately to transmit respective MIMO transmissions that carry different data stream(s). For instance, the UE may configure the first antenna panel 604-1 to transmit a first MIMO transmission 606-1 (e.g., a PUSCH MIMO transmission) that is directed to and/or propagates towards a first TRP 608-1 that is associated with a network node 610 (e.g., a network node 110). In some aspects, the first MIMO transmission 606-1 may include multiple layers (e.g., spatial layers and/or polarization layers), and each layer may carry a respective data stream associated with a first set of data streams 612-1. To illustrate, a first layer of the first MIMO transmission 606-1 (shown as Layer 0) may carry a first data stream associated with the first set of data streams 612-1, and a second layer of the first MIMO transmission 606-1 (shown as Layer 1) may carry a second data stream associated with the first set of data streams 612-1. Alternatively, or additionally, the UE may configure the second antenna panel 604-2 to transmit a second MIMO transmission 606-2 (e.g., a PUSCH MIMO transmission) that is directed to and/or propagates towards a second TRP 608-2 associated with the network node 610. In the example 600, the second MIMO transmission 606-2 includes a third layer (shown as Layer 2) that carries a third data stream associated with a second set of data streams 612-2, and a fourth layer (shown as Layer 3) that carries a fourth data stream associated with the second set of data streams 612-2. Accordingly, in the example 600, the first set of data streams 612-1 are carried in multiple layers of the first MIMO transmission 606-1, and the second set of data streams 612-2 are carried in multiple layers of the second MIMO transmission 606-2.

In some aspects, a single DCI (e.g., with an uplink DCI format) may schedule and/or configure the first MIMO transmission 606-1 and the second MIMO transmission 606-2. Alternatively, or additionally, the single DCI may indicate one or more parameters associated with configuring the first antenna panel 604-1 and the second antenna panel 604-2. That is, the single DCI may schedule and/or configure a PUSCH transmission based at least in part on indicating one or more DMRS ports as shown by reference number 614 to use for the PUSCH transmission. Alternatively, or additionally, the single DCI may include an SRS resource set indicator field that indicates and/or selects one or more configured SRS resource sets (e.g., RRC configured SRS resource sets) that are associated with the PUSCH transmission. For instance, the SRS resource set indicator field may indicate a first SRS resource set (of the configured SRS resource sets) that is associated with the first MIMO transmission 606-1 and a second SRS resource set (of the configured SRS resource sets) that is associated with the second MIMO transmission 606-2. To illustrate, a first set of one or more transmission ports may be associated with the first SRS resource set and, accordingly, one or more transmission parameters associated with the first MIMO transmission 606-1. A second set of one or more transmission ports may be associated with the second SRS resource set and, accordingly, one or more transmission parameters that are associated with the second MIMO transmission 606-2.

As one example, the SRS resource set indicator field may be two bits long, and the network node 610 may set the SRS resource set indicator field to a first value (e.g., "00") to indicate that a PUSCH transmission is only associated with a first SRS resource set (e.g., the PUSCH transmission is associated with a single TRP (sTRP) and is based at least in part on the first SRS resource set) and/or a second value (e.g., "01") to indicate that the PUSCH transmission is only associated with a second SRS resource set (e.g., the PUSCH transmission is associated with the single TRP and is based at least in part on the second SRS resource set). Alternatively, or additionally, and as shown by FIG. 6A, the network node 610 may indicate a third value (e.g., "10") to indicate the PUSCH transmission is associated with at least two SRS resource sets and/or two TRPs. Accordingly, the network node 610 may dynamically switch the PUSCH transmission between an sTRP transmission and an SDM transmission based at least in part on setting the SRS resource set indicator field to different values.

In some aspects, the single DCI may include first SRI and/or TPMI fields 616-1 that are associated with transmission of the first set of data stream layers 608-1, and second SRI and/or TPMI fields 616-2 that are associated with transmission of the second set of data stream layers 612-2. For example, a TPMI field may indicate a precoding matrix and/or a number of transmission layers for an uplink transmission, and an SRI field may indicate a resource allocation (e.g., in frequency and time) for transmission of an SRS. The UE may apply a first precoding matrix indicated by the first SRI and/or TPMI fields 616-1 to the first set of data streams 612-1 to form the first MIMO transmission 606-1. Alternatively, or additionally, the UE may apply a second precoding matrix indicated by the second SRI and/or TPMI fields 616-2 to the second set of data streams 612-2 to form the second MIMO transmission 606-2. In some aspects, the network node 610 may generate channel estimation metrics based at least in part on an SRS transmitted by the UE (e.g., based at least in part on information indicated by the first SRI and/or TPMI fields 616-1 and/or the second SRI and/or TPMI fields 616-2) and configure transmission parameters for the UE to improve a signal quality of the first MIMO transmission 606-1 and/or the second MIMO transmission 606-2. Alternatively, or additionally, the SRI field may enable the UE to adjust uplink transmission parameters based on current channel conditions, such as a transmission power level, an MCS, and/or an antenna port (e.g., the PUSCH port(s) shown by reference number 614). To illustrate, for poor channel conditions associated with a low signal-to-noise ratio (SNR), the UE may increase a transmit power level (e.g., indicated based at least in part on the first SRI and/or TPMI fields 616-1 and/or the second SRI and/or TPMI fields 616-2) to increase SNR, and for good channel conditions associated with high SNR, the UE may decrease the transmit power level to conserve battery power.

The second example 602 shown by FIG. 6B is an example of STxMP that is based at least in part on an SFN. In some aspects, multiple transmitters operating in an SFN mode may transmit a same signal (e.g., with the same content) based at least in part on using a same frequency at a same time. To illustrate, in the example 602, the UE (e.g., a UE 120) includes the first antenna panel 604-1 and the second antenna panel 604-2 as described with regard to FIG. 6A, and the UE may configure each antenna panel separately to transmit respective MIMO transmissions (shown as a first MIMO transmission 618-1 and a second MIMO transmission 618-2). In some aspects, each MIMO transmission may be configured with multiple layers (e.g., spatial layers and/or polarization layers), each layer may carry a respective data stream, and each MIMO transmission may carry the same data stream(s). To illustrate, the UE may be configured to transmit a first data stream 620-1 (shown with a solid line) and a second data stream 620-2 (shown with a dashed line). As shown by reference number 622, the first MIMO transmission 618-1 may be based at least in part on both the first data stream 620-1 and the second data stream 620-2. As shown by reference number 624, the second MIMO transmission 618-2 may also be based at least in part on both the first data stream 620-1 and the second data stream 620-2. To illustrate, Layer 0 of the first MIMO transmission 618-1 and Layer 0 of the second MIMO transmission 618-2 may each carry the first data stream 620-1. Layer 1 of the first MIMO transmission 618-1 and Layer 1 of the second MIMO transmission 618-2 may each carry the second data stream 620-2. Accordingly, in the example 602, the first data stream 620-1 and the second data stream 620-1 are both carried in the first MIMO transmission 618-1 and the second MIMO transmission 618-2.

Similar to as described with regard to FIG. 6A, the UE may configure the first antenna panel 604-1 to transmit the first MIMO transmission 618-1 towards the first TRP 608-1 and the second antenna panel 604-2 to transmit the second MIMO transmission 618-2 towards the second TRP 608-2. Alternatively, or additionally, a single DCI may schedule and/or configure the first MIMO transmission 618-1 and the second MIMO transmission 618-2 and/or may indicate one or more parameters associated with configuring the first antenna panel 604-1 and the second antenna panel 604-2. In some aspects, the single DCI may schedule and/or configure a PUSCH transmission based at least in part on indicating one or more DMRS ports as shown by reference number 614 to use for the PUSCH transmission (e.g., the first MIMO transmission 618-1 and/or the second MIMO transmission 618-2). Alternatively, or additionally, the single DCI may include an SRS resource set indicator field, the first SRI and/or TPMI fields 616-1 that are associated with transmission of the first MIMO transmission 618-1, and the second SRI and/or TPMI fields 616-2 that are associated with transmission of the second MIMO transmission 618-2. Accordingly, the network node 610 may dynamically switch the PUSCH transmission between an sTRP transmission and an SFN transmission based at least in part on setting the SRS resource set indicator field to different values as described above.

The single DCI described with regard to FIGS. 6A and 6B may include a PTRS-DMRS association bitfield that associates a PTRS port with a DMRS port. The PTRS-DMRS field may be present in the single DCI when multiple layers (e.g., more than one) are configured for a transmission. As one example, for a multi-layer transmission associated with sTRP communications, the PTRS-DMRS associated field may be present based at least in part on an RRC configured field indicating a value greater than one. Alternatively, or additionally, for sTRP communications, the PTRS-DMRS association bitfield may be absent from DCI when a transmission carries a single layer and, subsequently, uses a single DMRS port. That is, the PTRS-DMRS association bitfield may be absent based at least in part on the RRC configured field (e.g., maxRank) indicating a value of one.

To illustrate, a PTRS port may be associated and/or based at least in part on a single DMRS port out of multiple DMRS ports, such as the DMRS port that generates a transmission with higher signal quality (e.g., higher SNR and/or higher RSSI) relative to the other DMRS port transmissions. Associating the PTRS port with such a DMRS port may enable transmission of a PTRS with higher signal quality based at least in part on using the DMRS port associated with higher signal quality. A single-layer transmission may implicitly indicate the association between the PTRS port and the DMRS port based at least in part on the single-layer transmission using a single port. Accordingly, the explicit indication of a PTRS-DMRS association (e.g., via a PTRS-DMRS association bitfield) may be more relevant for transmissions that include multiple layers and use multiple ports (e.g., multiple DMRS ports). Accordingly, for maxRank equal to one, the PTRS-DMRS associated field may be absent from DCI to avoid redundancy.

The configuration of an STxMP transmission may indicate a number of layers in a different manner than the configuration of an sTRP transmission. Accordingly, determining a number of transmission layers may differ between operating modes and/or transmission configurations. As one example, for dynamic switching between an SDM STxMP operating mode (e.g., as described with regard to FIG. 6A) and an sTRP operating mode as described above, the maximum number of layers of an sTRP transmission may be RRC configured. As one example, for a codebook based UL sTRP transmission, the maximum number of layers may be based at least in part on an RRC configured maxRank value. Alternatively, or additionally, for a non-codebook based UL sTRP transmission, the maximum number of layers may be based at least in part on an RRC configured Lmax value that indicates a maximum number of layers. The maximum number of layers of an SDM STxMP transmission may be configured based at least in part on a single maximum number of layers value (e.g., different from the RRC configured maxRank value and/or Lmax value) that is applied to both the first SRS resource set and a second SRS resource set, separately. As another example, for dynamic switching between the sTRP operating mode and the SFN STxMP operating mode (e.g., as described with regard to FIG. 6B), the maximum number of layers of an sTRP transmission may be based at least in part on the RRC configured maxRank value and/or the RRC configured Lmax value as described above, and the maximum number of layers of an SFN STxMP transmission may be based at least in part on a maximum number of layers that is configured and/or indicated by a different parameter than the RRC configured maxRank and/or the RRC configured Lmax.

The different mechanisms for determining a maximum number of layers for a transmission may result in ambiguity on a bitlength and/or presence of the PTRS-DMRS association bitfield in uplink scheduling DCI when dynamically switching between an sTRP operating mode and an STxMP operating mode. To illustrate, a first operating configuration associated with switching between an SDM STxMP operating mode and an sTRP operating mode may be based at least in part on a PTRS uplink configuration IE being RRC configured, CP-OFDM being enabled, and two SRS resource sets having a usage set to a codebook usage type or a non-codebook usage type. In such a configuration, when sTRP is the active operating mode, the PTRS-DMRS association bitfield may be absent in the uplink scheduling DCI based at least in part on maxRank having a value of one, and may be present in the uplink scheduling DCI (e.g., with a bit length of two) based at least in part on maxRank having a value greater than one. Based at least in part on dynamically switching to or from the SDM STxMP operating mode (e.g., disabling sTRP and enabling SDM STxMP, and/or vice versa), and the SDM STxMP operating mode having a different mechanism that indicates the maximum rank and/or the maximum number of layers, the presence and/or length of the PTRS-DMRS association bitfield may be ambiguous.

A second operating configuration associated with switching between an SFN STxMP operating mode and the sTRP operating mode may be based at least in part on similar configurations as described above (e.g., a configured PTRS uplink configuration IE, enabled CP-OFDM, and two SRS resource sets configured with the codebook usage type or the non-codebook usage type). In a similar manner as described above, dynamically switching from the sTRP operating mode to the SFN STxMP operating mode (or vice versa) may result in an ambiguity related to the presence and/or length of the PTRS-DMRS association bitfield based at least in part on the SFN STxMP operating mode using a different mechanism to indicate a maximum number of layers relative to the sTRP operating mode. Having ambiguity in the length and/or presence of a PTRS-DMRS association bitfield in DCI (e.g., uplink scheduling DCI) may result in a UE interpreting information in DCI incorrectly and, subsequently, result in misaligned and/or failed communications between the UE and a network node. That is, the UE misinterpreting information in DCI may result in the UE using different transmission parameters for an uplink transmission than expected by the network node, and may result in the network node failing to receive and/or decode the uplink transmission.

Some techniques and apparatuses described herein provide for selecting a PTRS-DMRS association bitfield length for transitions between STxMP transmissions and sTRP transmissions. In some aspects, a network node may derive a first potential length for a PTRS-DMRS association bitfield based at least in part on an STxMP operating mode, such as an SDM operating mode or an SFN operating mode. The network node may also derive a second potential length for the PTRS-DMRS association bitfield based at least in part on an sTRP configuration. Based at least in part on deriving the first potential length and the second potential length, the network node may select a finalized length for the PTRS-DMRS association bitfield based at least in part on the first potential length and the second potential length. In some aspects, the network node may indicate a relationship between a PTRS port and a DMRS port based at least in part on transmitting a DCI with a configuration that is associated with the finalized length of the PTRS-DMRS association bitfield.

In some aspects, a UE may derive a first potential length for a PTRS-DMRS association bitfield based at least in part on an STxMP operating mode, such as an SDM operating mode or an SFN operating mode. The UE may also derive a second potential length for the PTRS-DMRS association bitfield based at least in part on an sTRP configuration. Based at least in part on deriving the first potential length and the second potential length, the UE may select a finalized length for the PTRS-DMRS association bitfield based at least in part on the first potential length and the second potential length. In some aspects, the UE may communicate with a network node based at least in part on recovering an indication of a relationship between a PTRS port and a DMRS port from DCI using a DCI configuration that is based at least in part on the finalized length of the PTRS-DMRS association bitfield.

A network node and a UE may derive a bit length of a PTRS-DMRS association bitfield using same and/or commensurate information. Using the same and/or commensurate information may synchronize how a network node may configure uplink scheduling DCI and how a UE interprets uplink scheduling DCI. In some aspects, the derivation may be based at least in part on an STxMP operating mode (e.g., an SDM operating mode or an SFN operating mode) and an sTRP configuration. Deriving the bit length of the PTRS-DMRS association bitfield jointly from an STxMP operating mode and an sTRP configuration may result in a DCI configuration that both supports dynamic switching between an STxMP operating mode and an sTRP operating mode, and maintains an ability to indicate a relationship between one or more PTRS ports and one or more DMRS ports in both operating modes. Alternatively, or additionally, the network node and the UE deriving the bit length of the PTRS-DMRS association bitfield using same and/or commensurate information may mitigate ambiguity in the bit length of the PTRS-DMRS association bitfield and, subsequently, mitigate ambiguity in DCI. Accordingly, mitigating the ambiguity may result in the network node indicating, and the UE recovering, information in DCI. Alternatively, or additionally, the UE may generate an uplink transmission based at least in part on the recovered information (e.g., transmission parameters), and the network node may successfully receive and/or decode the uplink transmission.

As indicated above, 6A and 6B are provided as examples. Other examples may differ from what is described with regard to FIGS. 6A and 6B.

Figure 7:
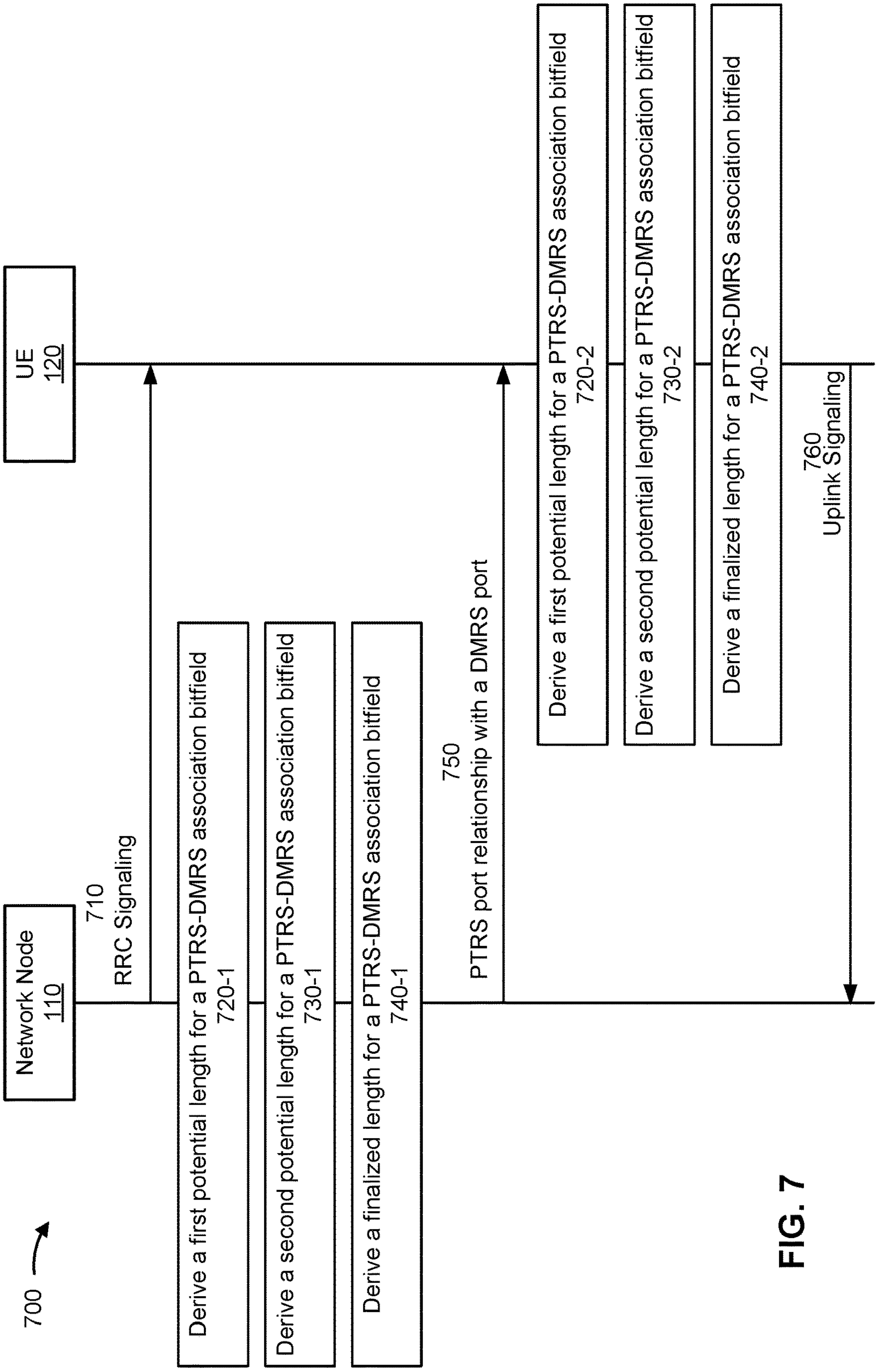
FIG. 7 is a diagram illustrating an example of a wireless communication process between a network node and a UE, in accordance with the present disclosure.

FIG. 7 is a diagram illustrating an example 700 of a wireless communication process between a network node (e.g., the network node 110) and a UE (e.g., the UE 120), in accordance with the present disclosure.

As shown by reference number 710, a network node 110 may transmit, and a UE 120 may receive, RRC signaling. In some aspects, the RRC signaling may indicate configuration information, such as SRS resource configuration information, SRS resource set configuration information, PTRS uplink configuration information (e.g., via a PTRS configuration IE), and/or PUSCH uplink configuration (e.g., via a PUSCH configuration IE). To illustrate, the RRC signaling may indicate any combination of parameters, such as a maximum number of layers that are associated with an sTRP transmission, a SDM-specific maximum number of layers value, an SFN-specific maximum number of layers value, a configured SDM-specific maximum number of PTRS ports (also referred to as maxNrofPortsforSdm), a configured SFN-specific maximum number of PTRS ports (also referred to as maxNroPortsforSfn), an SRS resource usage type, an SRS resource, and/or enabling of CP-OFDM.

As shown by reference number 720-1, the network node 110 may derive a first potential length of a PTRS-DMRS association bitfield that may be included in uplink scheduling DCI. In some aspects, the network node 110 may derive the first potential length for the PTRS-DMRS association bitfield based at least in part on a configuration associated with dynamically switching between an STxMP operating mode and an sTRP operating mode. To illustrate, a first potential transmission configuration may include at least two configured (e.g., RRC configured) SRS resource sets, an SRS resource that includes a usage field that is set to at least one of a codebook usage type or a non-codebook usage type, an SDM STxMP operating mode, a configured uplink PTRS configuration, and CP-OFDM being enabled. In some aspects, and based at least in part on identifying that a current transmission configuration is the first potential transmission configuration, the network node may determine to derive the first potential length for the PTRS-DMRS association bitfield.

As one example, and based at least in part on the STxMP operating mode being an SDM STxMP operating mode (e.g., the dynamic switching is based at least in part on switching between the SDM STxMP operating mode and the sTRP operating mode), the network node 110 may derive and/or determine that the PTRS-DMRS association bitfield is always present in DCI (e.g., uplink scheduling DCI) and/or that the first potential length of the PTRS-DMRS association bitfield is two bits. Alternatively, or additionally, the network node 110 may derive that the first potential length is an SDM-specific length for the PTRS-DMRS association bitfield.

As another example, and based at least in part on the current transmission configuration being the first potential transmission configuration and the STxMP operating mode being an SDM STxMP operating mode, the network node 110 may derive the first potential length based at least in part on at least one of: a configured maximum rank associated with the SDM mode (e.g., a configured SDM-specific maximum number of layers), which may also be referred to as maxRankSdm, and/or a configured number of PTRS ports associated with the SDM mode (e.g., a configured SDM-specific number of PTRS ports), which may also be referred to as maxNrofPortsforSdm. In some aspects, the configured SDM-specific maximum rank indicates a number of layers associated with an SRS resource set of the at least two SRS resource sets. Alternatively, or additionally, a total number of layers associated with an SDM transmission (e.g., that is based at least in part on at least two SRS resource sets) is an integer multiple of the number of layers indicated by the configured SDM-specific maximum rank. To illustrate, and with regard to FIG. 6A, a configured SDM-specific maximum rank of two may result in a total number layers of four (e.g., two layers for a first SRS resource set and/or the first MIMO transmission 606-1 and two layers for a second SRS resource set and/or the second MIMO transmission 606-2).

In some aspects, the configured SDM-specific maximum rank may be set to one and the configured SDM-specific maximum number of PTRS ports may also be set to one. Based at least in part on the configured SDM-specific maximum rank and the configured SDM-specific maximum number of PTRS ports each being set to one, the network node 110 may derive the first potential length as being one. In other aspects, the SDM-specific configured maximum rank may be set to one and the configured SDM-specific maximum number of PTRS ports may be set to two. Based at least in part on the SDM-specific configured maximum rank being set to one and the configured SDM-specific maximum number of PTRS ports being set to two, the network node 110 may derive the first potential length as being zero. That is, the network node 110 may derive that the PTRS-DMRS association bitfield is absent from DCI, and/or that a first DMRS port is implicitly associated with a first PTRS port and a second DMRS port is implicitly associated with a second PTRS port. In some aspects, a DMRS port index that designates a "first" DMRS port and/or a "second" DMRS port may be indicated in DCI and may be based at least in part on an RRC configured table.

Alternatively, or additionally, for an SDM STxMP operating mode, the configured SDM-specific maximum rank may be set to two, and the configured SDM-specific maximum number of PTRS ports may be set to one. Based at least in part on the configured SDM-specific maximum rank being set to two, and the configured SDM-specific maximum number of PTRS ports being set to one, the network node 110 may derive that the first potential length is two.

In some aspects, for an SDM STxMP operating mode, the configured SDM-specific maximum rank may be set to two, and the configured SDM-specific maximum number of PTRS ports may also be set to two. Based at least in part on the configured SDM-specific maximum rank being set to two, and the configured SDM-specific maximum number of PTRS ports also being set to two, the network node 110 may derive that the first potential length is two.

In some other aspects, deriving the first potential length may be based at least in part on an SFN STxMP operating mode (e.g., the dynamic switching is based at least in part on switching between using the SFN STxMP operating mode and an sTRP operating mode). To illustrate, a second potential transmission configuration may include at least two configured (e.g., RRC configured) SRS resource sets, an SRS resource that includes a usage field that is set to at least one of a codebook usage type or a non-codebook usage type, an SFN STxMP operating mode, a configured uplink PTRS configuration, and CP-OFDM being enabled. The network node 110 may determine that a current transmission configuration is the second potential transmission configuration, and that an STxMP operating mode is a SFN operating mode as described with regard to FIG. 6B. In some aspects, the network node may determine that the PTRS-DMRS association bitfield is always present in DCI (e.g., uplink scheduling DCI) and that the first potential length is two bits.

Alternatively, or additionally, for an SFN STxMP operating mode, the network node 110 may derive the first potential length based at least in part on a configured maximum rank associated with the SFN mode (e.g., a configured SFN-specific maximum rank), which may also be referred to as maxRankSfn. To illustrate, the configured SFN-specific maximum rank may indicate a number of layers associated with at least two SRS resource sets, and the number of layers indicated by the configured SFN-specific maximum rank (e.g., maxRankSfn) may be a maximum number of layers associated with the SFN operating mode. For example, and with regard to FIG. 6B, a configured SFN-specific maximum rank of two may indicate that, combined, the first MIMO transmission 618-1 and the second MIMO transmission 618-2 have two layers.

In some aspects, for an SFN STxMP operating mode, the configured SFN-specific maximum rank (e.g., maxRankSfn) may be set to one, and the network node 110 may derive that the first potential length is zero. Alternatively, or additionally, for an SFN STxMP operating mode, the configured SFN-specific maximum rank may be set to a value greater than one (e.g., two or more), and the network node 110 may derive that the first potential length is two.

As shown by reference number 730-1, the network node 110 may derive a second potential length of the PTRS-DMRS association bitfield. That is, the network node 110 may derive, as the second potential length of the PTRS-DMRS association bitfield, a length that is associated with an sTRP configuration and/or an sTRP transmission. In some aspects, the network node 110 may derive the second potential length of the PTRS-DMRS association bitfield based at least in part on a transmission configuration that is associated with dynamically switching between an sTRP configuration and an STxMP configuration. In some aspects, the network node 110 may derive the second potential length for the PTRS-DMRS association bitfield based at least in part on an SRS resource set indicator value and/or SRS resource set indicator field that is associated with selection of a single SRS resource set. To illustrate, a first value (e.g., "00") that is associated with the SRS resource set indicator field may select a first (single) SRS resource set, and the network node 110 may derive the second potential length based at least in part on a maxRank associated with the first SRS resource set. Alternatively, or additionally, a second value (e.g., "01") that is associated with the SRS resource set indicator field may select a second (single) SRS resource set, and the network node 110 may derive the second potential length based at least in part on a maxRank associated with the second SRS resource set. Accordingly, the network node 110 may calculate, prior to transmitting DCI, one or more potential bit lengths of one or more fields of the DCI to determine a longest potential DCI bit length out of multiple different transmission configurations.

As shown by reference number 740-1, the network node 110 may derive a finalized length of the PTRS-DMRS association bitfield. In some aspects, the network node 110 may select, as the finalized length, a maximum length of the first potential length and the second potential length. To illustrate, if the first potential length is larger than the second potential length, the network node 110 may select the first potential length as the finalized length. Alternatively, or additionally, if the second potential length is larger than the first potential length, the network node 110 may select the second potential length as the finalized length.

As shown by reference number 750, the network node 110 may transmit, and the UE 120 may receive, an indication of a relationship between a PTRS port and a DMRS port. To illustrate, the network node 110 may configure DCI using a DCI configuration (e.g., bitfields that are included, lengths of bitfields, and/or zero-padding) that is based least in part on the finalized length. In some aspects, the network node 110 may include the PTRS-DMRS association bitfield in DCI based at least in part on using the finalized length as the length of the PTRS-DMRS association bitfield. In some aspects, the network node 110 may zero-pad any unused bit(s) in the PTRS-DMRS association bitfield. To illustrate, for a finalized length of two (e.g., the PTRS-DMRS association bitfield is always present in uplink scheduling DCI and has a length of two), the network node 110 may zero-pad one or more unused bits in the PTRS-DMRS association bitfield. Alternatively, or additionally, the network node 110 may exclude the PTRS-DRMS association bit field from the DCI, such as for a finalized length of zero as described above.

As another example, the network node 110 may calculate a first potential DCI bit length that is based at least in part on the STxMP configuration and the first potential length. The first potential DCI bit length may be a total number of bits include in the entirety of the DCI and/or a total number of bits associated with every bitfield included in the DCI (e.g., except for a zero padding bitfield). The network node 110 may also calculate a second potential DCI bit length that is based at least in part on an sTRP configuration and the second potential length. In some aspects, the network node 110 may calculate a bit length difference between the first DCI bit length and the second DCI bit length. In some aspects, the network node may determine, based at least in part on a value indicated by an SRS resource set indicator field, selection of the STxMP configuration or the sTRP configuration. The network node 110 may zero-pad an end of the DCI based at least in part on the selection being associated with a shorter DCI bit length of the first potential DCI bit length and the second DCI bit length. For example, if the value indicates selection of at least two SRS resource sets and the STxMP configuration, and, in scenarios in which the first DCI bit length is shorter than the second DCI bit length (e.g., associated with the sTRP configuration), the network node 110 may zero pad an end of the DCI based at least in part on the bit length difference. As another example, the value may indicate selection of a single SRS resource set and the sTRP configuration. In scenarios in which the second DCI bit length is shorter than the first DCI bit length (e.g., associated with the STxMP configuration), the network node 110 may zero pad an end of the DCI based at least in part on the bit length difference. Accordingly, the network node 110 may transmit the DCI based at least in part on any configuration as described above, such as by including the PTRS-DMRS association bitfield with zero-padding, without zero-padding, and/or by zero-padding an end of DCI.

As shown by reference number 720-2, the UE 120 may derive a first potential length of a PTRS-DMRS association bitfield. In some aspects, the UE 120 may derive the first potential length of the PTRS-DMRS based at least in part on determining that a current transmission configuration is based at least in part on dynamically switching between an STxMP operating mode and an sTRP operating mode, in a similar manner to the derivation of the first potential length by the network node 110 described with regard to reference number 720-1. As one example, the UE 120 may determine that a current transmission configuration is the first potential transmission configuration, and derive the first potential length based at least in part on a configured SDM-specific maximum number of layers and/or a configured SDM-specific number of PTRS ports. As another example, the UE 120 may determine that the current transmission configuration is the second potential transmission configuration, and derive the first potential length based at least in part on a configured SFN-specific maximum number of layers and/or a configured SFN-specific number of PTRS ports. Alternatively, or additionally, the UE 120 may determine that the PTRS-DMRS association bitfield is always present in DCI (e.g., uplink scheduling DCI) and has a length of two. While the example 700 shows the UE 120 deriving the first potential length after reception of DCI, other examples may include the UE 120 deriving the first potential length prior to reception of DCI.

As shown by reference number 730-2, the UE 120 may derive a second potential length of the PTRS-DMRS association bitfield. In some aspects, the UE 120 may derive the second potential length of the PTRS-DMRS in a similar manner to the derivation of the second potential length by the network node 110 described with regard to reference number 730-1. To illustrate, the UE 120 may derive the second potential length for the PTRS-DMRS association bitfield based at least in part on an SRS resource set indicator field indicating selection of a single SRS resource set. While the example 700 shows the UE 120 deriving the second potential length after reception of DCI, other examples may include the UE 120 deriving the second potential length prior to reception of DCI.

As shown by reference number 740-2, the UE 120 may derive a finalized length of the PTRS-DMRS association bitfield. In some aspects, the UE 120 may derive the finalized length of the PTRS-DMRS association bitfield in a similar manner to the derivation of the finalized length by the network node 110 described with regard to reference number 740-1. For example, the UE 120 may select, as the finalized length, a maximum length of the first potential length and the second potential length. Alternatively, or additionally, the UE 120 may select, as the finalized length, either the first potential length or the second potential length based at least in part on a value of the SRS resource set indicator field. While the example 700 shows the UE 120 deriving the finalized length after reception of DCI, other examples may include the UE 120 deriving the finalized length prior to reception of DCI.

As shown by reference number 760, the UE 120 may transmit, and the network node 110 may receive, an uplink transmission that is based at least in part on the finalized length of the PTRS-DMRS association bitfield. To illustrate, and in a similar manner as described with regard to the network node 110, the UE 120 may recover information from DCI based at least in part on deriving the finalized length of the PTRS-DMRS association bitfield and/or deriving a DCI configuration (e.g., bitfields included in the DCI, lengths of the bit fields, a bit length of DCI based at least in part on an STxMP configuration, a bit length of DCI based at least in part on an SFN configuration, deriving whether the PTRS-DMRS association bitfield includes zero-padding, and/or deriving whether the DCI includes zero-padding at the end). Based at least in part on using the same and/or commensurate information as the network node 110, the UE may extract transmission parameter(s) and/or transmission information from the DCI as configured by the network node 110, such as by recovering an indication of a relationship between a PTRS port and a DMRS port. Accordingly, the UE 120 may generate an uplink transmission based at least in part on the relationship between the PTRS port and the DMRS port.

As described above, a network node and a UE may derive a bit length of a PTRS-DMRS association bitfield using same and/or commensurate information. Using the same and/or commensurate information may synchronize how the network node may configure uplink scheduling DCI and how the UE interprets uplink scheduling DCI. In some aspects, deriving a bit length of a PTRS-DMRS association bitfield using same and/or commensurate information as described above may result in a DCI configuration that remains constant when switching between an STxMP operating mode and an sTRP operating mode. Alternatively, or additionally, using the same and/or commensurate information to derive the bit length of the PTRS-DMRS association bitfield may mitigate ambiguity in DCI. Mitigating the ambiguity may result in the UE successfully recovering information in DCI, generating an uplink transmission based at least in part on the recovered information, and the network node successfully receiving and/or decoding the uplink transmission.

As indicated above, FIG. 7 is provided as an example. Other examples may differ from what is described with regard to FIG. 7.

Figure 8:
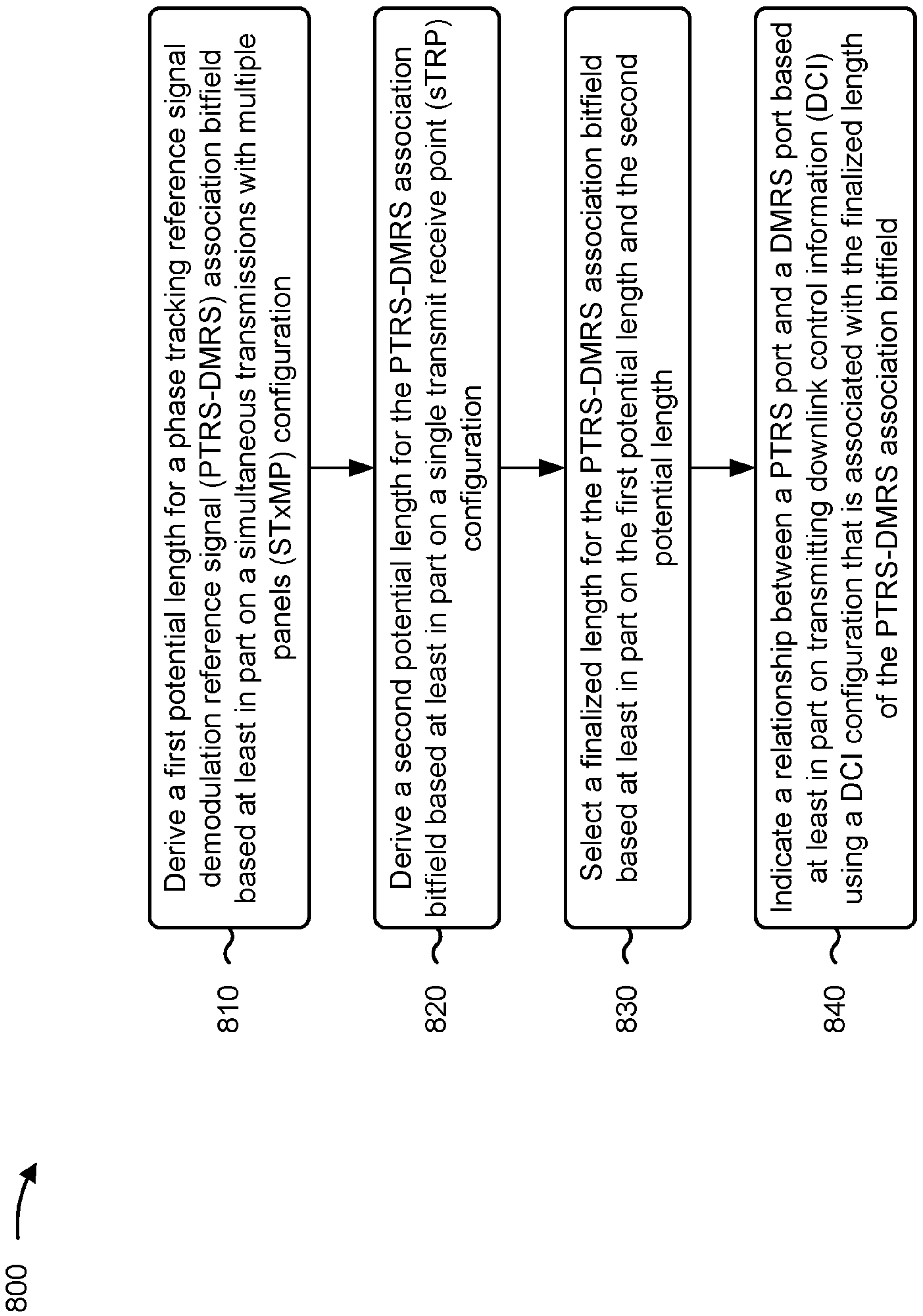
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 110) performs operations associated with selecting a PTRS-DMRS association bitfield length.

As shown in FIG. 8, in some aspects, process 800 may include deriving a first potential length for a PTRS-DMRS association bitfield based at least in part on an STxMP configuration (block 810). For example, the network node (e.g., using communication manager 1006, depicted in FIG. 10) may derive a first potential length for a PTRS-DMRS association bitfield based at least in part on an STxMP configuration, as described above.

As further shown in FIG. 8, in some aspects, process 800 may include deriving a second potential length for the PTRS-DMRS association bitfield based at least in part on an sTRP configuration (block 820). For example, the network node (e.g., using communication manager 1006, depicted in FIG. 10) may derive a second potential length for the PTRS-DMRS association bitfield based at least in part on an sTRP configuration, as described above.

As further shown in FIG. 8, in some aspects, process 800 may include selecting a finalized length for the PTRS-DMRS association bitfield based at least in part on the first potential length and the second potential length (block 830). For example, the network node (e.g., using communication manager 1006, depicted in FIG. 10) may select a finalized length for the PTRS-DMRS association bitfield based at least in part on the first potential length and the second potential length, as described above.

As further shown in FIG. 8, in some aspects, process 800 may include indicating a relationship between a PTRS port and a DMRS port based at least in part on transmitting DCI using a DCI configuration that is associated with the finalized length of the PTRS-DMRS association bitfield (block 840). For example, the network node (e.g., using transmission component 1004 and/or communication manager 1006, depicted in FIG. 10) may indicate a relationship between a PTRS port and a DMRS port based at least in part on transmitting DCI using a DCI configuration that is associated with the finalized length of the PTRS-DMRS association bitfield, as described above.

Process 800 may include additional aspects, such as any single aspect or any combination of aspects described below and/or in connection with one or more other processes described elsewhere herein.

In a first aspect, a transmission configuration associated with the PTRS-DMRS association bitfield includes at least two SRS resource sets, the transmission configuration includes a usage field that is set to at least one of a codebook usage type or a non-codebook usage type, the transmission configuration indicates that the STxMP configuration is an SDM mode, the transmission configuration includes a configured uplink phase tracking reference signal configuration, and the transmission configuration includes CP-OFDM being enabled.

In a second aspect, the DCI is uplink scheduling DCI, and deriving the first potential length comprises determining that the PTRS-DMRS association bitfield is always present in the uplink scheduling DCI, and deriving that the first potential length is two bits.

In a third aspect, the first potential length is an SDM-specific length for the PTRS-DMRS association bitfield.

In a fourth aspect, deriving the first potential length includes deriving the first potential length based at least in part on at least one of a configured maximum rank associated with the SDM mode (e.g., maxRankSdm), or a configured maximum number of PTRS ports associated with the SDM mode (e.g., maxNrofPortsforSdm).

In a fifth aspect, at least one of the configured maximum rank or the configured maximum number of PTRS ports is an RRC configured parameter.

In a sixth aspect, the configured maximum rank indicates a number of layers associated with an SRS resource set of the at least two SRS resource sets, and a total number of layers associated with the at least two SRS resource sets is an integer multiple of the number of layers indicated by the configured maximum rank.

In a seventh aspect, the configured maximum rank associated with the SDM mode (e.g., maxRankSdm) is set to one, the configured maximum number of PTRS ports is set to one, and deriving the first potential length includes deriving the first potential length as one based at least in part on the configured maximum rank associated with the SDM mode being set to one, and the configured maximum number of PTRS ports being set to one.

In an eighth aspect, the configured maximum rank associated with the SDM mode (e.g., maxRankSdm) is set to one, the configured maximum number of PTRS ports is set to two, and deriving the first potential length includes deriving the first potential length as zero based at least in part on the configured maximum rank associated with the SDM mode being set to one, and the configured maximum number of PTRS ports being set to two.

In a ninth aspect, the transmission configuration, based at least in part on the first potential length being zero, indicates that a first DMRS port is associated with a first PTRS port, and a second DMRS port is associated with a second PTRS port.

In a tenth aspect, the configured maximum rank associated with the SDM mode (e.g., maxRankSdm) is set to two, the configured maximum number of PTRS ports is set to one, and deriving the first potential length includes deriving the first potential length as two based at least in part on the configured maximum rank associated with the SDM mode being set to two, and the configured maximum number of PTRS ports being set to one.

In an eleventh aspect, the configured maximum rank associated with the SDM mode (e.g., maxRankSdm) is set to two, the configured maximum number of PTRS ports is set to two, and deriving the first potential length includes deriving the first potential length as two based at least in part on the configured maximum rank associated with the SDM mode being set to two, and the configured maximum number of PTRS ports being set to two.

In a twelfth aspect, deriving the second potential length for the PTRS-DMRS association bitfield is based at least in part on an SRS resource set indicator field indicating selection of a single SRS resource set.

In a thirteenth aspect, selecting the finalized length for the PTRS-DMRS association bitfield includes selecting, as the finalized length, a maximum length of the first potential length and the second potential length.

In a fourteenth aspect, indicating the relationship between the PTRS port and the DMRS port includes: including the PTRS-DMRS association bitfield in DCI based at least in part on the finalized length, and zero-padding any unused bit in the PTRS-DMRS association bitfield.

In a fifteenth aspect, process 800 includes calculating a first potential DCI bit length that is based at least in part on the STxMP configuration and the first potential length, calculating a second potential DCI bit length that is based at least in part on an sTRP configuration and the second potential length, calculating a bit length difference between the first DCI bit length and the second DCI bit length, determining, based at least in part on a value indicated by an SRS resource set indicator field, selection of the STxMP configuration or the sTRP configuration, and zero-padding an end of DCI based at least in part on the selection being associated with a shorter DCI bit length of the first potential DCI bit length and the second DCI bit length.

In a sixteenth aspect, the value indicates selection of at least two SRS resource sets and the STxMP configuration.

In a seventeenth aspect, the value indicates selection of a single SRS resource set and the sTRP configuration.

In a eighteenth aspect, a transmission configuration associated with the PTRS-DMRS association bitfield includes at least two SRS resource sets, the transmission configuration includes a usage field that is set to at least one of a codebook usage type or a non-codebook usage type, the transmission configuration indicates that the STxMP configuration is an SFN mode, the transmission configuration includes a configured uplink phase tracking reference signal uplink configuration, and the transmission configuration includes CP-OFDM being enabled.

In a nineteenth aspect, the DCI is uplink scheduling DCI, and deriving the first potential length comprises determining that the PTRS-DMRS association bitfield is always present in the uplink scheduling DCI, and determining that the first potential length is two bits.

In a twentieth aspect, deriving the first potential length includes deriving the first potential length based at least in part on a configured maximum rank associated with the SFN mode.

In a twenty-first aspect, the configured maximum rank indicates a number of layers associated with at least two SRS resource sets, and the number of layers is a maximum number of layers associated with the SFN mode.

In a twenty-second aspect, the configured maximum rank associated with the SFN mode is set to one, and deriving the first potential length includes deriving that the first potential length is zero based at least in part on the configured maximum rank associated with the SFN mode being set to one.

In a twenty-third aspect, the configured maximum rank associated with the SFN mode is set to a value that is greater than one, and deriving the first potential length includes deriving the first potential length as two based at least in part on the value being greater than one.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
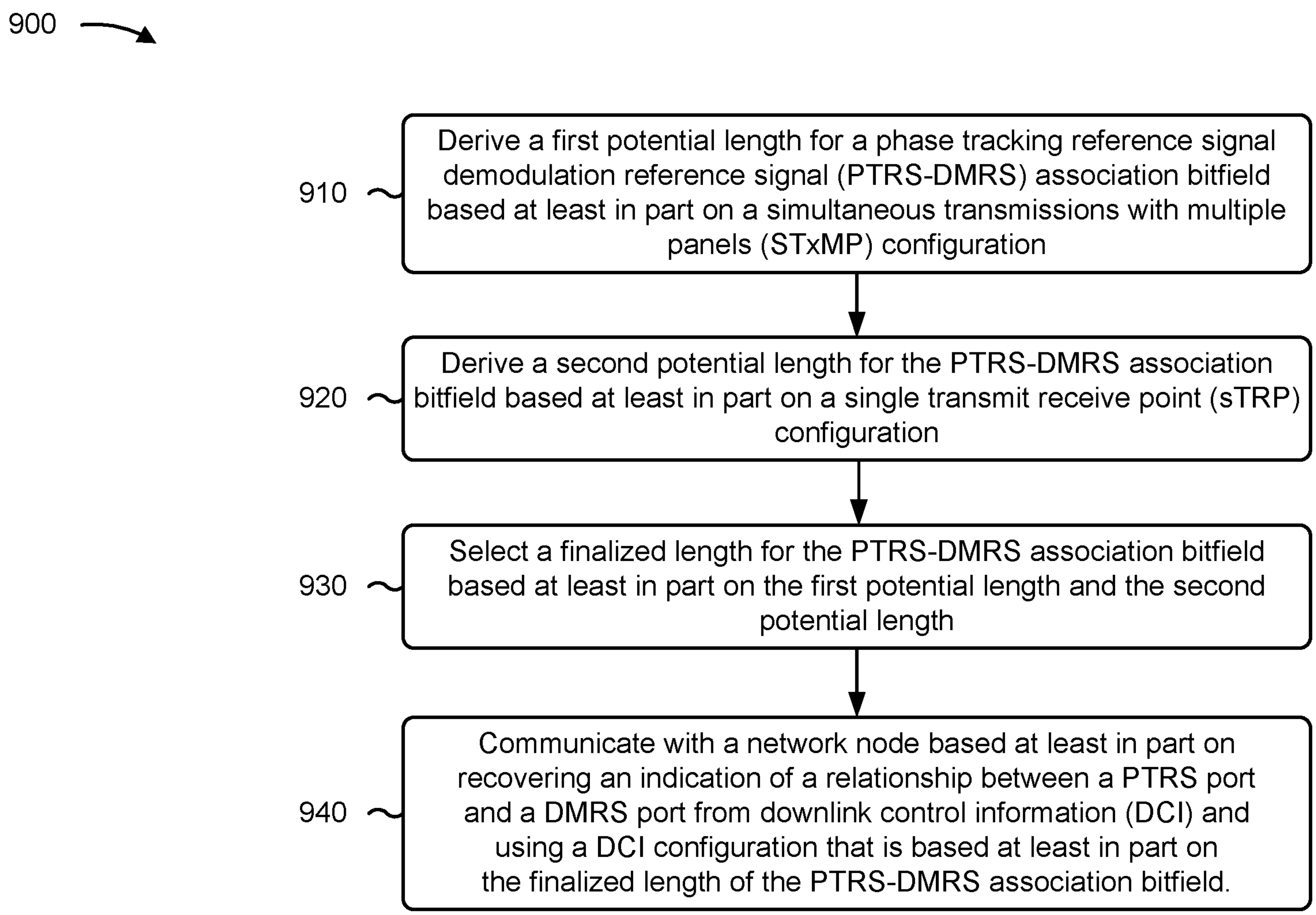
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with selecting a PTRS-DMRS association bitfield length.

As shown in FIG. 9, in some aspects, process 900 may include deriving a first potential length for a PTRS-DMRS association bitfield based at least in part on an STxMP configuration (block 910). For example, the UE (e.g., using communication manager 1106, depicted in FIG. 11) may derive a first potential length for a PTRS-DMRS association bitfield based at least in part on an STxMP configuration, as described above.

As further shown in FIG. 9, in some aspects, process 900 may include deriving a second potential length for the PTRS-DMRS association bitfield based at least in part on an sTRP configuration (block 920). For example, the UE (e.g., using communication manager 1106, depicted in FIG. 11) may derive a second potential length for the PTRS-DMRS association bitfield based at least in part on an sTRP configuration, as described above.

As further shown in FIG. 9, in some aspects, process 900 may include selecting a finalized length for the PTRS-DMRS association bitfield based at least in part on the first potential length and the second potential length (block 930). For example, the UE (e.g., using communication manager 1106, depicted in FIG. 11) may select a finalized length for the PTRS-DMRS association bitfield based at least in part on the first potential length and the second potential length, as described above.

As further shown in FIG. 9, in some aspects, process 900 may include communicating with a network node based at least in part on recovering an indication of a relationship between a PTRS port and a DMRS port from DCI and using a DCI configuration that is based at least in part on the finalized length of the PTRS-DMRS association bitfield (block 940). For example, the UE (e.g., using reception component 1102, transmission component 1104, and/or communication manager 1106, depicted in FIG. 11) may communicate with a network node based at least in part on recovering an indication of a relationship between a PTRS port and a DMRS port from DCI and using a DCI configuration that is based at least in part on the finalized length of the PTRS-DMRS association bitfield, as described above.

Process 900 may include additional aspects, such as any single aspect or any combination of aspects described below and/or in connection with one or more other processes described elsewhere herein.

In a first aspect, a transmission configuration associated with the PTRS-DMRS association bitfield includes at least two SRS resource sets, the transmission configuration includes a usage field that is set to at least one of a codebook usage type or a non-codebook usage type, the transmission configuration indicates that the STxMP configuration includes an SDM mode, the transmission configuration includes a configured uplink phase tracking reference signal uplink configuration, and the transmission configuration includes CP-OFDM being enabled.

In a second aspect, the DCI is uplink scheduling DCI, and deriving the first potential length comprises determining that the PTRS-DMRS association bitfield is always present in the uplink scheduling DCI, and deriving that the first potential length is two bits.

In a third aspect, the first potential length is an SDM-specific length for the PTRS-DMRS association bitfield.

In a fourth aspect, deriving the first potential length includes deriving the first potential length based at least in part on at least one of a configured maximum rank associated with the SDM mode (e.g., maxRankSdm), or a configured maximum number of PTRS ports associated with the SDM mode (e.g., maxNrofPortsforSdm).

In a fifth aspect, at least one of the configured maximum rank or the configured maximum number of PTRS ports is an RRC configured parameter.

In a sixth aspect, the configured maximum rank indicates a number of layers associated with an SRS resource set of the at least two SRS resource sets, and a total number of layers associated with the at least two SRS resource sets is an integer multiple of the number of layers indicated by the configured maximum rank.

In a seventh aspect, the configured maximum rank associated with the SDM mode (e.g., maxRankSdm) is set to one, the configured maximum number of PTRS ports is set to one, and deriving the first potential length includes deriving the first potential length as one based at least in part on the configured maximum rank associated with the SDM mode being set to one, and the configured maximum number of PTRS ports being set to one.

In an eighth aspect, the configured maximum rank associated with the SDM mode (e.g., maxRankSdm) is set to one, the configured maximum number of PTRS ports is set to two, and deriving the first potential length includes deriving the first potential length as zero based at least in part on the configured maximum rank associated with the SDM mode being set to one, and the configured maximum number of PTRS ports being set to two.

In a ninth aspect, the transmission configuration, based at least in part on the first potential length being zero, indicates that a first DMRS port is associated with a first PTRS port, and a second DMRS port is associated with a second PTRS port.

In a tenth aspect, the configured maximum rank associated with the SDM mode (e.g., maxRankSdm) is set to two, the configured maximum number of PTRS ports is set to one, and deriving the first potential length includes deriving the first potential length as two based at least in part on the configured maximum rank associated with the SDM mode being set to two, and the configured maximum number of PTRS ports being set to one.

In an eleventh aspect, the configured maximum rank associated with the SDM mode (e.g., maxRankSdm) is set to two, the configured maximum number of PTRS ports is set to two, and deriving the first potential length includes deriving the first potential length as two based at least in part on the configured maximum rank associated with the SDM mode being set to two, and the configured maximum number of PTRS ports being set to two.

In a twelfth aspect, deriving the second potential length for the PTRS-DMRS association bitfield is based at least in part on an SRS resource set indicator field indicating selection of a single SRS resource set.

In a thirteenth aspect, selecting the finalized length for the PTRS-DMRS association bitfield includes selecting, as the finalized length, a maximum length of the first potential length and the second potential length.

In a fourteenth aspect, process 900 includes extracting, from DCI, a value from the PTRS-DMRS association based at least in part on the finalized length, and determining the relationship based at least in part on the value.

In a fifteenth aspect, process 900 includes calculating a first potential DCI bit length that is based at least in part on the STxMP configuration and the first potential length, calculating a second potential DCI bit length that is based at least in part on the sTRP configuration and the second potential length, calculating a bit length difference between the first DCI bit length and the second DCI bit length, determining a zero-padding length at an end of DCI, based at least in part on a value that is indicated by a sounding reference signal (SRS) resource set indicator field, the value indicates selection of the STxMP configuration or the sTRP configuration, and the zero padding length is based at least in part on the selection being associated with a shorter DCI bit length of the first potential DCI bit length and the second DCI bit length.

In a sixteenth aspect, the value indicates selection of at least two SRS resource sets and the STxMP configuration.

In a seventeenth aspect, the value indicates selection of a single SRS resource set and the sTRP configuration.

In an eighteenth aspect, a transmission configuration associated with the PTRS-DMRS association bitfield includes at least two SRS resource sets, the transmission configuration includes a usage field that is set to at least one of a codebook usage type or a non-codebook usage type, the transmission configuration indicates that the STxMP configuration includes an SFN mode, the transmission configuration includes a configured uplink phase tracking reference signal uplink configuration, and the transmission configuration includes CP-OFDM being enabled.

In a nineteenth aspect, the DCI is uplink scheduling DCI, and deriving the first potential length comprises determining that the PTRS-DMRS association bitfield is always present in uplink scheduling DCI, and determining that the first potential length is two bits.

In a twentieth aspect, deriving the first potential length includes deriving the first potential length based at least in part on a configured maximum rank associated with the SFN mode.

In a twenty-first aspect, the configured maximum rank indicates a number of layers associated with at least two SRS resource sets, and the number of layers is a maximum number of layers associated with the SFN mode.

In a twenty-second aspect, the configured maximum rank associated with the SFN mode is set to one, and deriving the first potential length includes deriving that the first potential length is zero based at least in part on the configured maximum rank associated with the SFN mode being set to one.

In a twenty-third aspect, the configured maximum rank associated with the SFN mode is set to a value that is greater than one, and deriving the first potential length includes deriving the first potential length as two based at least in part on the value being greater than one.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
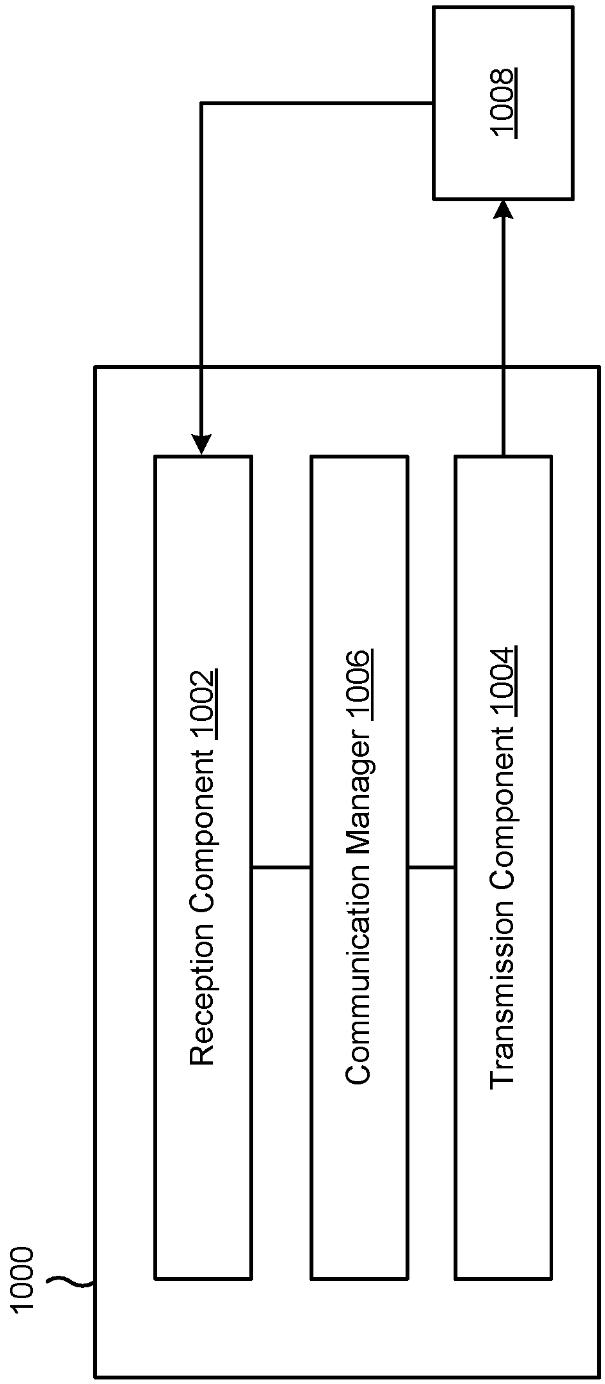
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 6A-9. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The communication manager 1006 may derive a first potential length for a PTRS-DMRS association bitfield based at least in part on an STxMP configuration. The communication manager 1006 may derive a second potential length for the PTRS-DMRS association bitfield based at least in part on an sTRP configuration. The communication manager 1006 may select a finalized length for the PTRS-DMRS association bitfield based at least in part on the first potential length and the second potential length. The communication manager 1006 and/or the transmission component 1004 may indicate a relationship between a PTRS port and a DMRS port based at least in part on transmitting DCI using a DCI configuration that is associated with the finalized length of the PTRS-DMRS association bitfield.

The communication manager 1006 may calculate a first potential DCI bit length that is based at least in part on the STxMP configuration and the first potential length.

The communication manager 1006 may calculate a second potential DCI bit length that is based at least in part on an sTRP configuration and the second potential length.

The communication manager 1006 may calculate a bit length difference between the first DCI bit length and the second DCI bit length.

The communication manager 1006 may derive, based at least in part on a value indicated by a SRS resource set indicator field, selection of the STxMP configuration or the sTRP configuration.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
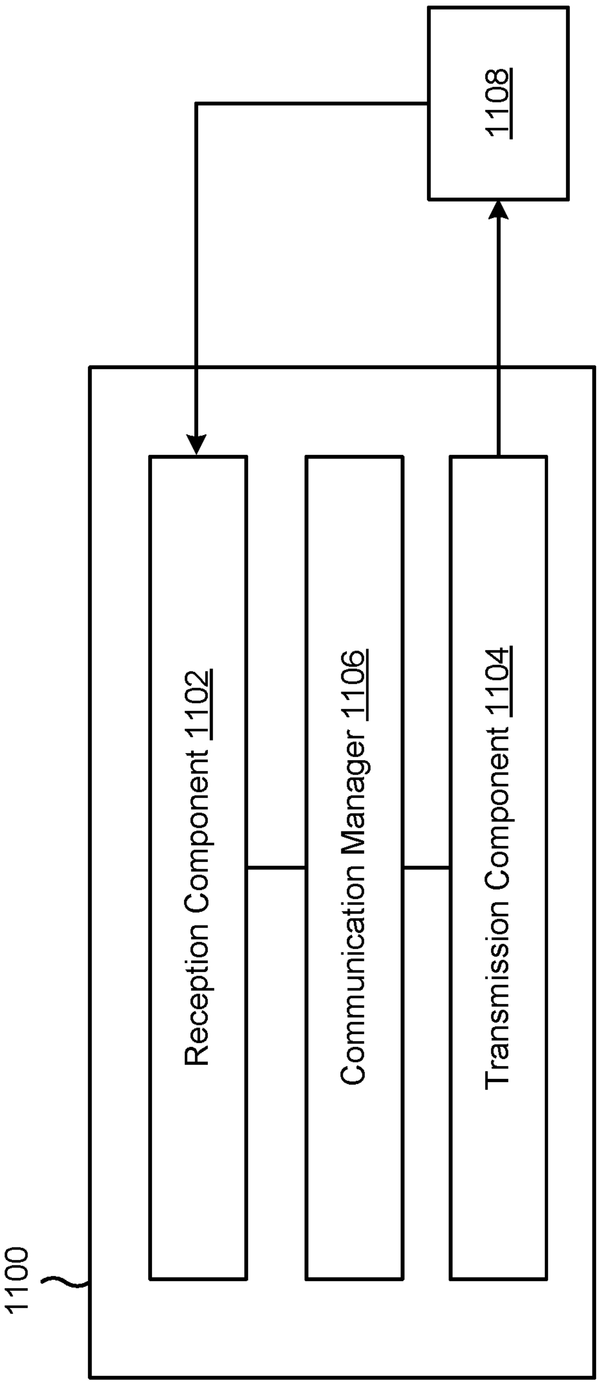
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 6A-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The communication manager 1106 may derive a first potential length for a PTRS-DMRS association bitfield based at least in part on an STxMP configuration. The communication manager 1106 may derive a second potential length for the PTRS-DMRS association bitfield based at least in part on an sTRP configuration. The communication manager 1106 may select a finalized length for the PTRS-DMRS association bitfield based at least in part on the first potential length and the second potential length. The reception component 1102 and/or the transmission component 1104 may communicate with a network node based at least in part on recovering an indication of a relationship between a PTRS port and a DMRS port from DCI and using a DCI configuration that is based at least in part on the finalized length of the PTRS-DMRS association bitfield.

The communication manager 1106 may extract, from DCI, a value from the PTRS-DMRS association based at least in part on the finalized length.

The communication manager 1106 may determine the relationship based at least in part on the value.

The communication manager 1106 may calculate a first potential DCI bit length that is based at least in part on the STxMP configuration and the first potential length.

The communication manager 1106 may calculate a second potential DCI bit length that is based at least in part on the sTRP configuration and the second potential length.

The communication manager 1106 may calculate a bit length difference between the first DCI bit length and the second DCI bit length.

The communication manager 1106 may derive a zero-padding length at an end of DCI, based at least in part on a value that is indicated by a SRS resource set indicator field, the value indicates selection of the STxMP configuration or the sTRP configuration.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a network node, comprising: deriving a first potential length for a phase tracking reference signal demodulation reference signal (PTRS-DMRS) association bitfield based at least in part on a simultaneous transmissions with multiple panels (STxMP) configuration; deriving a second potential length for the PTRS-DMRS association bitfield based at least in part on a single transmit receive point (sTRP) configuration; selecting a finalized length for the PTRS-DMRS association bitfield based at least in part on the first potential length and the second potential length; and indicating a relationship between a PTRS port and a DMRS port based at least in part on transmitting downlink control information (DCI) using a DCI configuration that is associated with the finalized length of the PTRS-DMRS association bitfield.

Aspect 2: The method of Aspect 1, wherein a transmission configuration associated with the PTRS-DMRS association bitfield includes at least two signaling reference signal (SRS) resource sets, wherein the transmission configuration includes a usage field that is set to at least one of: a codebook usage type or a non-codebook usage type, wherein the transmission configuration indicates that the STxMP configuration comprises a spatial division multiplexing (SDM) mode, wherein the transmission configuration includes a configured uplink phase tracking reference signal configuration, and wherein the transmission configuration includes cyclic prefix orthogonal frequency division multiplexing (CP-OFDM) being enabled.

Aspect 3: The method of Aspect 2, wherein the DCI is uplink scheduling DCI, and wherein deriving the first potential length comprises: determining that the PTRS-DMRS association bitfield is always present in the uplink scheduling DCI; and deriving that the first potential length is two bits.

Aspect 4: The method of Aspect 3, wherein the first potential length is an SDM-specific length for the PTRS-DMRS association bitfield.

Aspect 5: The method of Aspect 2, wherein deriving the first potential length comprises: deriving the first potential length based at least in part on at least one of: a configured maximum rank associated with the SDM mode, or a configured maximum number of PTRS ports associated with the SDM mode.

Aspect 6: The method of Aspect 5, wherein at least one of the configured maximum rank associated with the SDM mode or the configured maximum number of PTRS ports associated with the SDM mode is a radio resource control (RRC) configured parameter.

Aspect 7: The method of Aspect 5, wherein the configured maximum rank associated with the SDM mode indicates a number of layers associated with an SRS resource set of the at least two SRS resource sets; and wherein a total number of layers associated with the at least two SRS resource sets is an integer multiple of the number of layers indicated by the configured maximum rank associated with the SDM mode.

Aspect 8: The method of Aspect 5, wherein the configured maximum rank associated with the SDM mode is set to one, wherein the configured maximum number of PTRS ports associated with the SDM mode is set to one, and wherein deriving the first potential length comprises: deriving the first potential length as one based at least in part on: the configured maximum rank associated with the SDM mode being set to one; and the configured maximum number of PTRS ports being set to one.

Aspect 9: The method of Aspect 5, wherein the configured maximum rank associated with the SDM mode is set to one, wherein the configured maximum number of PTRS ports associated with the SDM mode is set to two, and wherein deriving the first potential length comprises: deriving the first potential length as zero based at least in part on: the configured maximum rank associated with the SDM mode being set to one; and the configured maximum number of PTRS ports associated with the SDM mode being set to two.

Aspect 10: The method of Aspect 9, wherein the transmission configuration, based at least in part on the first potential length being zero, indicates that: a first DMRS port is associated with a first PTRS port; and a second DMRS port is associated with a second PTRS port.

Aspect 11: The method of Aspect 5, wherein the configured maximum rank associated with the SDM mode is set to two, wherein the configured maximum number of PTRS ports associated with the SDM mode is set to one, and wherein deriving the first potential length comprises: deriving the first potential length as two based at least in part on: the configured maximum rank associated with the SDM mode being set to two; and the configured maximum number of PTRS ports associated with the SDM mode being set to one.

Aspect 12: The method of Aspect 5, wherein the configured maximum rank associated with the SDM mode is set to two, wherein the configured maximum number of PTRS ports associated with the SDM mode is set to two, and wherein deriving the first potential length comprises: deriving the first potential length as two based at least in part on: the configured maximum rank associated with the SDM mode being set to two; and the configured maximum number of PTRS ports associated with the SDM mode being set to two.

Aspect 13: The method of any of Aspects 1-12, wherein deriving the second potential length for the PTRS-DMRS association bitfield is based at least in part on a sounding reference signal (SRS) resource set indicator field indicating selection of a single SRS resource set.

Aspect 14: The method of any of Aspects 1-13, wherein selecting the finalized length for the PTRS-DMRS association bitfield comprises: selecting, as the finalized length, a maximum length of the first potential length and the second potential length.

Aspect 15: The method of Aspect 14, wherein indicating the relationship between the PTRS port and the DMRS port comprises: including the PTRS-DMRS association bitfield in downlink control information (DCI) based at least in part on the finalized length; and zero-padding any unused bit in the PTRS-DMRS association bitfield.

Aspect 16: The method of any of Aspects 1-15, further comprising: calculating a first potential DCI bit length that is based at least in part on the STxMP configuration and the first potential length; calculating a second potential DCI bit length that is based at least in part on an sTRP configuration and the second potential length; calculating a bit length difference between the first DCI bit length and the second DCI bit length; deriving, based at least in part on a value indicated by a sounding reference signal (SRS) resource set indicator field, selection of the STxMP configuration or the sTRP configuration; and zero-padding an end of DCI based at least in part on the selection being associated with a shorter DCI bit length of the first potential DCI bit length and the second DCI bit length, the zero-padding the end of the DCI based at least in part on the selection being associated with a shorter DCI bit length of the first potential DCI bit length and the second DCI bit length.

Aspect 17: The method of Aspect 16, wherein the value indicates selection of at least two SRS resource sets and the STxMP configuration.

Aspect 18: The method of Aspect 16, wherein the value indicates selection of a single SRS resource set and the sTRP configuration.

Aspect 19: The method of any of Aspects 1-18, wherein a transmission configuration associated with the PTRS-DMRS association bitfield includes at least two signaling reference signal (SRS) resource sets, wherein the transmission configuration includes a usage field that is set to at least one of: a codebook usage type or a non-codebook usage type, wherein the transmission configuration indicates that the STxMP configuration comprises a single frequency network (SFN) mode, wherein the transmission configuration includes a configured uplink phase tracking reference signal uplink configuration, and wherein the transmission configuration includes cyclic prefix orthogonal frequency division multiplexing (CP-OFDM) being enabled.

Aspect 20: The method of Aspect 19, wherein the DCI is uplink scheduling DCI, and wherein deriving the first potential length comprises: determining that the PTRS-DMRS association bitfield is always present in the uplink scheduling DCI; and determining that the first potential length is two bits.

Aspect 21: The method of Aspect 19, wherein deriving the first potential length comprises: deriving the first potential length based at least in part on a configured maximum rank associated with the SFN mode.

Aspect 22: The method of Aspect 21, wherein the configured maximum rank associated with the SFN mode indicates a number of layers associated with at least two SRS resource sets, and wherein the number of layers is a maximum number of layers associated with the SFN mode.

Aspect 23: The method of Aspect 21, wherein the configured maximum rank associated with the SFN mode is set to one, and wherein deriving the first potential length comprises: deriving that the first potential length is zero based at least in part on the configured maximum rank associated with the SFN mode being set to one.

Aspect 24: The method of Aspect 21, wherein the configured maximum rank associated with the SFN mode is set to a value that is greater than one, and wherein deriving the first potential length comprises: deriving the first potential length as two based at least in part on the value being greater than one.

Aspect 25: A method of wireless communication performed by a user equipment (UE), comprising: deriving a first potential length for a phase tracking reference signal demodulation reference signal (PTRS-DMRS) association bitfield based at least in part on a simultaneous transmissions with multiple panels (STxMP) configuration; deriving a second potential length for the PTRS-DMRS association bitfield based at least in part on a single transmit receive point (sTRP) configuration; selecting a finalized length for the PTRS-DMRS association bitfield based at least in part on the first potential length and the second potential length; and communicating with a network node based at least in part on recovering an indication of a relationship between a PTRS port and a DMRS port from downlink control information (DCI) and using a DCI configuration that is based at least in part on the finalized length of the PTRS-DMRS association bitfield.

Aspect 26: The method of Aspect 25, wherein a transmission configuration associated with the PTRS-DMRS association bitfield includes at least two signaling reference signal (SRS) resource sets, wherein the transmission configuration includes a usage field that is set to at least one of: a codebook usage type or a non-codebook usage type, wherein the transmission configuration indicates that the STxMP configuration comprises a spatial division multiplexing (SDM) mode, wherein the transmission configuration includes a configured uplink phase tracking reference signal uplink configuration, and wherein the transmission configuration includes cyclic prefix orthogonal frequency division multiplexing (CP-OFDM) being enabled.

Aspect 27: The method of Aspect 26, wherein the DCI is uplink scheduling DCI, and wherein deriving the first potential length comprises: determining that the PTRS-DMRS association bitfield is always present in the uplink scheduling DCI; and deriving that the first potential length is two bits.

Aspect 28: The method of Aspect 27, wherein the first potential length is an SDM-specific length for the PTRS-DMRS association bitfield.

Aspect 29: The method of Aspect 26, wherein deriving the first potential length comprises: deriving the first potential length based at least in part on at least one of: a configured maximum rank associated with the SDM mode, or a configured maximum number of PTRS ports associated with the SDM mode.

Aspect 30: The method of Aspect 29, wherein at least one of the configured maximum rank associated with the SDM mode or the configured maximum number of PTRS ports associated with the SDM mode is a radio resource control (RRC) configured parameter.

Aspect 31: The method of Aspect 29, wherein the configured maximum rank associated with the SDM mode indicates a number of layers associated with an SRS resource set of the at least two SRS resource sets; and wherein a total number of layers associated with the at least two SRS resource sets is an integer multiple of the number of layers indicated by the configured maximum rank.

Aspect 32: The method of Aspect 29, wherein the configured maximum rank associated with the SDM mode is set to one, wherein the configured maximum number of PTRS ports associated with the SDM mode is set to one, and wherein deriving the first potential length comprises: deriving the first potential length as one based at least in part on: the configured maximum rank associated with the SDM mode being set to one; and the configured maximum number of PTRS ports associated with the SDM mode being set to one.

Aspect 33: The method of Aspect 29, wherein the configured maximum rank associated with the SDM mode is set to one, wherein the configured maximum number of PTRS ports associated with the SDM mode is set to two, and wherein deriving the first potential length comprises: deriving the first potential length as zero based at least in part on: the configured maximum rank associated with the SDM mode being set to one; and the configured maximum number of PTRS ports associated with the SDM mode being set to two.

Aspect 34: The method of Aspect 33, wherein the transmission configuration, based at least in part on the first potential length being zero, indicates that: a first DMRS port is associated with a first PTRS port; and a second DMRS port is associated with a second PTRS port.

Aspect 35: The method of Aspect 29, wherein the configured maximum rank associated with the SDM mode is set to two, wherein the configured maximum number of PTRS ports associated with the SDM mode is set to one, and wherein deriving the first potential length comprises: deriving the first potential length as two based at least in part on: the configured maximum rank associated with the SDM mode being set to two; and the configured maximum number of PTRS ports associated with the SDM mode being set to one.

Aspect 36: The method of Aspect 29, wherein the configured maximum rank associated with the SDM mode is set to two, wherein the configured maximum number of PTRS ports associated with the SDM mode is set to two, and wherein deriving the first potential length comprises: deriving the first potential length as two based at least in part on: the configured maximum rank associated with the SDM mode being set to two; and the configured maximum number of PTRS ports associated with the SDM mode being set to two.

Aspect 37: The method of Aspect 26, wherein deriving the second potential length for the PTRS-DMRS association bitfield is based at least in part on an SRS resource set indicator field indicating selection of a single SRS resource set.

Aspect 38: The method of any of Aspects 25-37, wherein selecting the finalized length for the PTRS-DMRS association bitfield comprises: selecting, as the finalized length, a maximum length of the first potential length and the second potential length.

Aspect 39: The method of Aspect 38, further comprising: extracting, from the DCI, a value from the PTRS-DMRS association bitfield based at least in part on the finalized length; and determining the relationship based at least in part on the value.

Aspect 40: The method of any of Aspects 25-39, further comprising: calculating a first potential DCI bit length that is based at least in part on the STxMP configuration and the first potential length; calculating a second potential DCI bit length that is based at least in part on the sTRP configuration and the second potential length; calculating a bit length difference between the first DCI bit length and the second DCI bit length; deriving a zero-padding length at an end of DCI, based at least in part on a value that is indicated by a sounding reference signal (SRS) resource set indicator field, wherein the value indicates selection of the STxMP configuration or the sTRP configuration; and wherein the zero padding length is based at least in part on the selection being associated with a shorter DCI bit length of the first potential DCI bit length and the second DCI bit length, wherein the zero padding length is based at least in part on the selection being associated with a shorter DCI bit length of the first potential DCI bit length and the second DCI bit length.

Aspect 41: The method of Aspect 40, wherein the value indicates selection of at least two SRS resource sets and the STxMP configuration.

Aspect 42: The method of Aspect 40, wherein the value indicates selection of a single SRS resource set and the sTRP configuration.

Aspect 43: The method of any of Aspects 25-42, wherein a transmission configuration associated with the PTRS-DMRS association bitfield includes at least two signaling reference signal (SRS) resource sets, wherein the transmission configuration includes a usage field that is set to at least one of: a codebook usage type or a non-codebook usage type, wherein the transmission configuration indicates that the STxMP configuration comprises a single frequency network (SFN) mode, wherein the transmission configuration includes a configured uplink phase tracking reference signal uplink configuration, and wherein the transmission configuration includes cyclic prefix orthogonal frequency division multiplexing (CP-OFDM) being enabled.

Aspect 44: The method of Aspect 43, wherein the DCI is uplink scheduling DCI, and wherein deriving the first potential length comprises: determining that the PTRS-DMRS association bitfield is always present in uplink scheduling DCI; and determining that the first potential length is two bits.

Aspect 45: The method of Aspect 43, wherein deriving the first potential length comprises: deriving the first potential length based at least in part on a configured maximum rank associated with the SFN mode.

Aspect 46: The method of Aspect 45, wherein the configured maximum rank associated with the SFN mode indicates a number of layers associated with at least two SRS resource sets, and wherein the number of layers is a maximum number of layers associated with the SFN mode.

Aspect 47: The method of Aspect 45, wherein the configured maximum rank associated with the SFN mode is set to one, and wherein deriving the first potential length comprises: deriving that the first potential length is zero based at least in part on the configured maximum rank associated with the SFN mode being set to one.

Aspect 48: The method of Aspect 45, wherein the configured maximum rank associated with the SFN mode is set to a value that is greater than one, and wherein deriving the first potential length comprises: deriving the first potential length as two based at least in part on the value being greater than one.

Aspect 49: An apparatus for wireless communication at a device, comprising a processor; memory coupled with the processor; and instructions stored in the memory and executable by the processor to cause the apparatus to perform the method of one or more of Aspects 1-24.

Aspect 50: An apparatus for wireless communication at a device, comprising a processor; memory coupled with the processor; and instructions stored in the memory and executable by the processor to cause the apparatus to perform the method of one or more of Aspects 25-48.

Aspect 51: A device for wireless communication, comprising a memory and one or more processors coupled to the memory, the one or more processors configured to perform the method of one or more of Aspects 1-24.

Aspect 52: A device for wireless communication, comprising a memory and one or more processors coupled to the memory, the one or more processors configured to perform the method of one or more of Aspects 25-48.

Aspect 53: An apparatus for wireless communication, comprising at least one means for performing the method of one or more of Aspects 1-24.

Aspect 54: An apparatus for wireless communication, comprising at least one means for performing the method of one or more of Aspects 25-48.

Aspect 55: A non-transitory computer-readable medium storing code for wireless communication, the code comprising instructions executable by a processor to perform the method of one or more of Aspects 1-24.

Aspect 56: A non-transitory computer-readable medium storing code for wireless communication, the code comprising instructions executable by a processor to perform the method of one or more of Aspects 25-48.

Aspect 57: A non-transitory computer-readable medium storing a set of instructions for wireless communication, the set of instructions comprising one or more instructions that, when executed by one or more processors of a device, cause the device to perform the method of one or more of Aspects 1-24.

Aspect 58: A non-transitory computer-readable medium storing a set of instructions for wireless communication, the set of instructions comprising one or more instructions that, when executed by one or more processors of a device, cause the device to perform the method of one or more of Aspects 25-48.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:

one or more memories; and one or more processors, coupled to the one or more memories, configured to cause the network node to:

derive a first potential length for a phase tracking reference signal demodulation reference signal (PTRS-DMRS) association bitfield based at least in part on a simultaneous transmissions with multiple panels (STxMP) configuration;

derive a second potential length for the PTRS-DMRS association bitfield based at least in part on a single transmit receive point (sTRP) configuration;

select a finalized length for the PTRS-DMRS association bitfield as a maximum length of the first potential length and the second potential length; and transmit downlink control information (DCI) using a DCI configuration that is associated with the finalized length of the PTRS-DMRS association bitfield.

2. The apparatus of claim 1, wherein the one or more processors, to cause the network node to transmit the DCI, are configured to cause the network node to:

include the PTRS-DMRS association bitfield in the DCI based at least in part on the finalized length; and zero-pad any unused bit in the PTRS-DMRS association bitfield.

3. The apparatus of claim 1, wherein a transmission configuration associated with the PTRS-DMRS association bitfield includes at least two signaling reference signal (SRS) resource sets, wherein the transmission configuration includes a usage field that is set to at least one of: a codebook usage type or a non-codebook usage type, wherein the transmission configuration indicates that the STxMP configuration comprises a spatial division multiplexing (SDM) mode, wherein the transmission configuration includes a configured uplink phase tracking reference signal configuration, and wherein the transmission configuration includes cyclic prefix orthogonal frequency division multiplexing (CP-OFDM) being enabled.

4. The apparatus of claim 3, wherein the one or more processors, to cause the network node to derive the first potential length, are configured to cause the network node to:

derive the first potential length based at least in part on at least one of:

a configured maximum rank associated with the SDM mode, or a configured maximum number of PTRS ports associated with the SDM mode.

5. The apparatus of claim 4, wherein the configured maximum rank associated with the SDM mode is set to one, wherein the configured maximum number of PTRS ports associated with the SDM mode is set to two, and wherein the one or more processors, to cause the network node to derive the first potential length, are configured to cause the network node to:

derive the first potential length as zero based at least in part on:

the configured maximum rank associated with the SDM mode being set to one; and the configured maximum number of PTRS ports associated with the SDM mode being set to two.

6. The apparatus of claim 1, wherein a transmission configuration associated with the PTRS-DMRS association bitfield includes at least two signaling reference signal (SRS) resource sets, wherein the transmission configuration includes a usage field that is set to at least one of: a codebook usage type or a non-codebook usage type, wherein the transmission configuration indicates that the STxMP configuration comprises a single frequency network (SFN) mode, wherein the transmission configuration includes a configured uplink phase tracking reference signal uplink configuration, and wherein the transmission configuration includes cyclic prefix orthogonal frequency division multiplexing (CP-OFDM) being enabled.

7. The apparatus of claim 6, wherein the one or more processors, to cause the network node to derive the first potential length, are configured to cause the network node to:

derive the first potential length based at least in part on a configured maximum rank associated with the SFN mode.

8. The apparatus of claim 7, wherein the configured maximum rank associated with the SFN mode is set to one, and wherein the one or more processors, to cause the network node to derive the first potential length, are configured to cause the network node to:

derive that the first potential length is zero based at least in part on the configured maximum rank associated with the SFN mode being set to one.

9. The apparatus of claim 7, wherein the configured maximum rank associated with the SFN mode is set to a value that is greater than one, and wherein the one or more processors, to cause the network node to derive the first potential length, are configured to cause the network node to:

derive the first potential length as two based at least in part on the value being greater than one.

10. An apparatus for wireless communication at a user equipment (UE), comprising:

one or more memories; and one or more processors, coupled to the one or more memories, configured to cause the UE to:

derive a first potential length for a phase tracking reference signal demodulation reference signal (PTRS-DMRS) association bitfield based at least in part on a simultaneous transmissions with multiple panels (STxMP) configuration;

derive a second potential length for the PTRS-DMRS association bitfield based at least in part on a single transmit receive point (sTRP) configuration;

select a finalized length for the PTRS-DMRS association bitfield as a maximum length of the first potential length and the second potential length; and communicate with a network node based at least in part on recovering information from downlink control information (DCI) based at least in part on the finalized length of the PTRS-DMRS association bitfield.

11. The apparatus of claim 10, wherein the one or more processors are further configured to cause the UE to:

extract, from the DCI, a value from the PTRS-DMRS association bitfield based at least in part on the finalized length; and determine the information based at least in part on the value.

12. The apparatus of claim 10, wherein a transmission configuration associated with the PTRS-DMRS association bitfield includes at least two signaling reference signal (SRS) resource sets, wherein the transmission configuration includes a usage field that is set to at least one of: a codebook usage type or a non-codebook usage type, wherein the transmission configuration indicates that the STxMP configuration comprises a spatial division multiplexing (SDM) mode, wherein the transmission configuration includes a configured uplink phase tracking reference signal uplink configuration, and wherein the transmission configuration includes cyclic prefix orthogonal frequency division multiplexing (CP-OFDM) being enabled.

13. The apparatus of claim 12, wherein the one or more processors, to cause the UE to derive the first potential length, are configured to cause the UE to:

derive the first potential length based at least in part on at least one of:

a configured maximum rank associated with the SDM mode, or a configured maximum number of PTRS ports associated with the SDM mode.

14. The apparatus of claim 13, wherein the configured maximum rank associated with the SDM mode is set to one, wherein the configured maximum number of PTRS ports is set to two, and wherein the one or more processors, to cause the UE to derive the first potential length, are configured to cause the UE to:

derive the first potential length as zero based at least in part on:

the configured maximum rank associated with the SDM mode being set to one; and the configured maximum number of PTRS ports associated with the SDM mode being set to two.

15. The apparatus of claim 10, wherein a transmission configuration associated with the PTRS-DMRS association bitfield includes at least two signaling reference signal (SRS) resource sets, wherein the transmission configuration includes a usage field that is set to at least one of: a codebook usage type or a non-codebook usage type, wherein the transmission configuration indicates that the STxMP configuration comprises a single frequency network (SFN) mode, wherein the transmission configuration includes a configured uplink phase tracking reference signal uplink configuration, and wherein the transmission configuration includes cyclic prefix orthogonal frequency division multiplexing (CP-OFDM) being enabled.

16. The apparatus of claim 15, wherein the one or more processors, to cause the UE to derive the first potential length, are configured to cause the UE to:

derive the first potential length based at least in part on a configured maximum rank associated with the SFN mode.

17. The apparatus of claim 16, wherein the configured maximum rank associated with the SFN mode is set to one, and wherein the one or more processors, to cause the UE to derive the first potential length, are configured to cause the UE to:

derive that the first potential length is zero based at least in part on the configured maximum rank associated with the SFN mode being set to one.

18. The apparatus of claim 17, wherein the configured maximum rank associated with the SFN mode is set to a value that is greater than one, and wherein the one or more processors, to cause the UE to derive the first potential length, are configured to cause the UE to:

derive the first potential length as two based at least in part on the value being greater than one.

19. A method of wireless communication performed by a network node, comprising:

deriving a first potential length for a phase tracking reference signal demodulation reference signal (PTRS-DMRS) association bitfield based at least in part on a simultaneous transmissions with multiple panels (STxMP) configuration;

deriving a second potential length for the PTRS-DMRS association bitfield based at least in part on a single transmit receive point (sTRP) configuration;

selecting a finalized length for the PTRS-DMRS association bitfield based at least in part on the first potential length and the second potential length, the selecting comprising: selecting, as the finalized length, a maximum length of the first potential length and the second potential length; and transmitting downlink control information (DCI) using a DCI configuration that is associated with the finalized length of the PTRS-DMRS association bitfield.

20. The method of claim 19, wherein transmitting the DCI comprises:

including the PTRS-DMRS association bitfield in the DCI based at least in part on the finalized length; and zero-padding any unused bit in the PTRS-DMRS association bitfield.

* * * * *